(12) United States Patent
Kotani et al.

(10) Patent No.: US 11,865,739 B2
(45) Date of Patent: Jan. 9, 2024

(54) METHOD OF MANUFACTURING A CORE PRODUCT

(71) Applicant: MITSUI HIGH-TEC, INC., Fukuoka (JP)

(72) Inventors: Shuhei Kotani, Fukuoka (JP); Katsumi Amano, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 325 days.

(21) Appl. No.: 17/399,645

(22) Filed: Aug. 11, 2021

(65) Prior Publication Data

US 2022/0055253 A1 Feb. 24, 2022

(30) Foreign Application Priority Data

Aug. 21, 2020 (JP) .................................. 2020-140227

(51) Int. Cl.
 *B29C 45/14* (2006.01)
 *B29B 17/00* (2006.01)
 *B29L 31/00* (2006.01)

(52) U.S. Cl.
 CPC .... *B29B 17/0005* (2013.01); *B29C 45/14344* (2013.01); *B29L 2031/7498* (2013.01)

(58) Field of Classification Search
 CPC .......... B29C 45/14344; B29C 45/1755; B29C 45/24; B29C 45/1759
 See application file for complete search history.

(56) References Cited

U.S. PATENT DOCUMENTS

2004/0191356 A1* 9/2004 Takeda ................ B29C 45/1759
 425/562

FOREIGN PATENT DOCUMENTS

JP 2015-023597 2/2015
WO WO2004009324 * 1/2004

* cited by examiner

*Primary Examiner* — Edmund H Lee
(74) *Attorney, Agent, or Firm* — GREENBLUM & BERNSTEIN, P.L.C.

(57) ABSTRACT

There are provided a method for manufacturing a core product, a method for removing a residual resin, and device for removing a residual resin including: supplying a molten resin; placing a conveying jig on a collection unit by conveying the conveying jig from a resin supply device to the collection unit together with a core body; splitting the resin solidified in a resin forming region from the resin solidified inside a resin flow path by removing the core body from the conveying jig; forming the residual resin which is a residue of the solidified resin inside the resin flow path and acquiring the core product including the core body and solidified resin formed in the resin forming region; and dropping the residual resin from the resin flow path into the collection unit by causing an extrusion unit to abut against the residual resin from above.

3 Claims, 19 Drawing Sheets

METHOD OF MANUFACTURING A CORE PRODUCT

CROSS-REFERENCE TO RELATED APPLICATIONS

This application is based on and claims priority under 35 USC 119 from Japanese Patent Application No. 2020-140227 filed on Aug. 21, 2020, the contents of which are incorporated herein by reference.

TECHNICAL FIELD

The present disclosure relates to a method for manufacturing a core product, a method for removing residual resin, and a device for removing residual resin.

BACKGROUND ART

JP2015-023597A discloses a resin filling device including: a lower mold having a plunger that pressurizes resin by extruding the resin upwardly; a resin injection mold disposed above the lower mold, capable of sliding up and down, and having an injection port for injecting the resin into a magnet insertion hole of a laminated core facing a lower end surface of the laminated core; and a pin that drops unnecessary substances in the injection port downward after the laminated core after the magnet insertion hole is filled with the resin is removed from the resin injection mold. Therefore, in the resin filling device of JP2015-023597A, the resin injection mold does not move in the horizontal direction toward other devices or the like. In other words, the removal of unnecessary substances from the injection port of the resin injection mold is completed in the resin filling device.

SUMMARY OF INVENTION

In general, a process of filling a magnet insertion hole with resin in a resin filling device takes a relatively long time. Therefore, as disclosed in JP2015-023597A, when there are processes other than resin filling, such as the removal of unnecessary substances, there is a concern that this may affect the production efficiency of core products. Therefore, for the purpose of improving the production efficiency of core products, in the manufacturing process of core products, there is a case where intermediates of core products pass through various devices. In such cases, for the purpose of making it easy to conveyed the intermediate, there is a case where the intermediate is conveyed between these devices in a state where the intermediate is placed on a conveying jig.

The conveying jig includes a resin flow path provided at locations corresponding to a resin forming region of the intermediate. When resin is formed in the resin forming region of the intermediate, in a state where the conveying jig on which the intermediate is placed is further placed on the lower mold, molten resin is injected from the lower mold into the resin forming region through a resin flow path. Thereafter, the intermediate after resin formation is removed from the conveying jig and conveyed to the next process, and the conveying jig is returned to a placing device for placing the intermediate before resin formation on the conveying jig.

When the intermediate after resin formation is removed from the conveying jig, the solidified resin remains in the resin flow path of the conveying jig. Therefore, there is a concern that the residual resin in the resin flow path may drop from the conveying jig and scatter around due to vibration generated in the conveying jig when the intermediate is removed from the conveying jig, vibration generated in the conveying jig when the conveying jig returns to the placing device, and the like.

Therefore, the present disclosure describes a method for manufacturing a core product, a method for removing residual resin, and a device for removing residual resin, which are capable of preventing residual resin that has fallen off from the conveying jig from scattering around.

According to an aspect of present disclosure, a method for manufacturing a core product includes: supplying a molten resin to a resin forming region through a resin flow path by a resin supply device, in a state where a core body is placed on a conveying jig such that the resin forming region provided in the core body communicatably connects with the resin flow path of the conveying jig; placing the conveying jig on a collection unit by conveying the conveying jig from the resin supply device to the collection unit together with the core body, after the supplying of the molten resin; splitting the resin solidified in the resin forming region from the resin solidified inside the resin flow path by removing the core body from the conveying jig, after the placing of the conveying jig in the collection unit; forming a residual resin which is a residue of the solidified resin inside the resin flow path and acquiring the core product including the core body and solidified resin formed in the resin forming region, by the splitting; and dropping the residual resin from the resin flow path into the collection unit by causing an extrusion unit to abut against the residual resin from above, after the forming of the residual resin.

According to another aspect of present disclosure, a method for removing a residual resin includes: placing a conveying jig on a collection unit by conveying the conveying jig to the collection unit together with a core body, in a state where the core body is placed on the conveying jig such that the resin forming region provided in the core body communicatably connects with the resin flow path of the conveying jig, the core body and the conveying jig having a solidified resin formed integrally in the resin forming region and inside the resin flow path; splitting the resin solidified in the resin forming region from the resin solidified inside the resin flow path by removing the core body from the conveying jig, after the placing of the conveying jig in the collection unit, forming the residual resin which is a residue of the solidified resin inside the resin flow path, by the splitting; and dropping the residual resin from the resin flow path to the collection unit by causing an extrusion unit to abut against the residual resin from above, after the forming of the residual resin.

According to another aspect of present disclosure, a device for removing a residual resin includes: a conveying unit configured to convey a conveying jig on which a core body having a resin forming region is placed, conveying jig having a resin flow path that communicatably connects with the resin forming region in a state where the core body is placed on the conveying jig; a collection unit configured to place the conveying jig thereon; a separation unit configured to separate the conveying jig placed on the collection unit and the core body placed on the conveying jig from each other; and an extrusion unit configured to extrude the residual resin downwardly to the collection unit, the residual resin remaining in the resin flow path of the conveying jig in a state after the core body is removed by the separation unit.

According to the method for manufacturing a core product, the method for removing residual resin, and the device for removing residual resin according to the present disclosure, it is possible to prevent the residual resin that has fallen off from the conveying jig from being scattered around.

DESCRIPTION OF EMBODIMENTS

Figure 1:
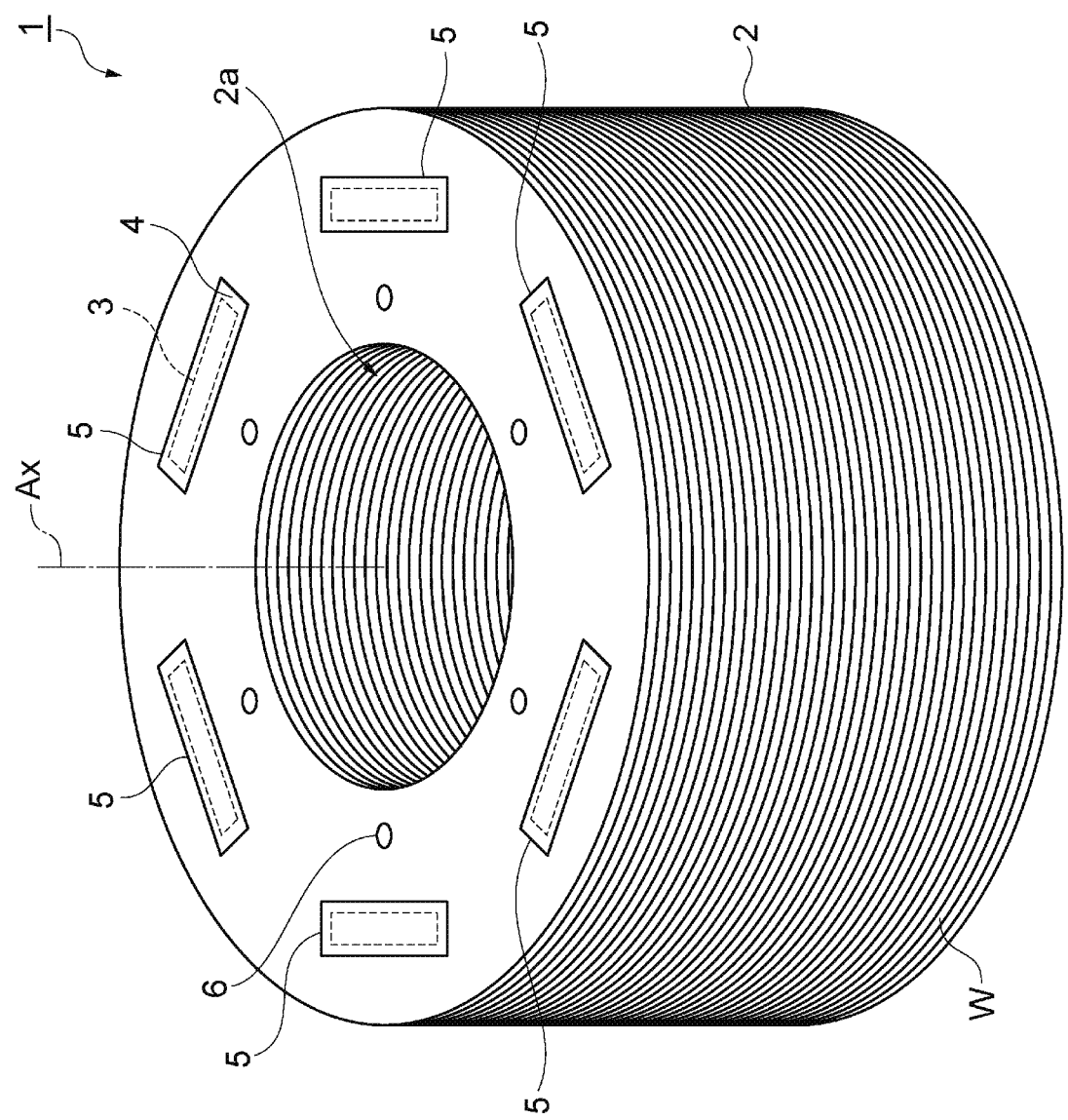
FIG. 1 is a perspective view illustrating an example of a rotor-laminated core.

In the following description, the same elements or elements having the same functions will be given the same reference numerals, and the duplicated description thereof will be omitted.

[Rotor-Laminated Core]

First, a configuration of a rotor-laminated core 1 (core product) will be described with reference to FIG. 1. The rotor-laminated core 1 includes a laminated body 2 (core body), a plurality of permanent magnets 3, and a plurality of solidified resins 4.

The laminated body 2 has a cylindrical shape. At the center portion of the laminated body 2, a shaft hole 2a through which the laminated body 2 penetrates to extend along a center axis Ax is provided. The shaft hole 2a extends in a height direction (up-down direction) of the laminated body 2. Since the laminated body 2 rotates around the center axis Ax, the center axis Ax is also a rotation axis. A shaft is inserted into the shaft hole 2a.

A plurality of magnet insertion holes (resin forming regions) 5 are formed in the laminated body 2. As illustrated in FIG. 1, the magnet insertion holes 5 may be arranged at predetermined intervals along an outer circumferential edge of the laminated body 2. Each of the magnet insertion holes 5 penetrates the laminated body 2 to extend along the center axis Ax (height direction). One permanent magnet 3 may be inserted into one magnet insertion hole 5, or a plurality of permanent magnets 3 may be inserted in one magnet insertion hole 5.

The laminated body 2 is configured by stacking a plurality of punching members W. The punching member W is a plate-like body in which a metal plate (for example, electromagnetic steel sheet) is punched into a predetermined shape, and has a shape that corresponds to the laminated body 2. The punching members W adjacent to each other in the height direction may be fastened to each other by a caulking unit 6 (refer to FIG. 1), may be joined by an adhesive, or may be bound by welding. The laminated body 2 may be configured by so-called rotary lamination or skew motion.

The solidified resin 4 is a solidified product of molten resin material (molten resin) that has filled in the magnet insertion hole 5 where the permanent magnet 3 is disposed. The solidified resin 4 may be configured to fix the permanent magnet 3 in the magnet insertion hole 5. The solidified resin 4 may be configured to join the punching members W adjacent to each other in the height direction (laminating direction) to each other.

[Manufacturing Apparatus of Rotor-Laminated Core]

Next, with reference to FIG. 2, a manufacturing apparatus 100 of the rotor-laminated core 1 will be described. The manufacturing apparatus 100 is configured to manufacture the rotor-laminated core 1 from a strip-like metal plate. The manufacturing apparatus 100 includes a press working device 200, a magnet attachment device 300, a resin supply device 400, a removing device 500, and a controller Ctr.

The press working device 200 is configured to form the punching member W from the metal plate by pressing the metal plate while intermittently feeding the strip-like metal plate. The press working device 200 is configured to sequentially laminate the plurality of formed punching members W to form the laminated body 2. After the laminated body 2 is mounted on a conveying jig 10, the laminated body 2 is conveyed to the magnet attachment device 300 by a conveying unit Cv1, for example (refer to arrow Ar1 in FIG. 2). The conveying unit Cv1 and conveying units Cv2 to Cv5 which will be described later may be, for example, a roller conveyor or a belt conveyor.

Figure 3:
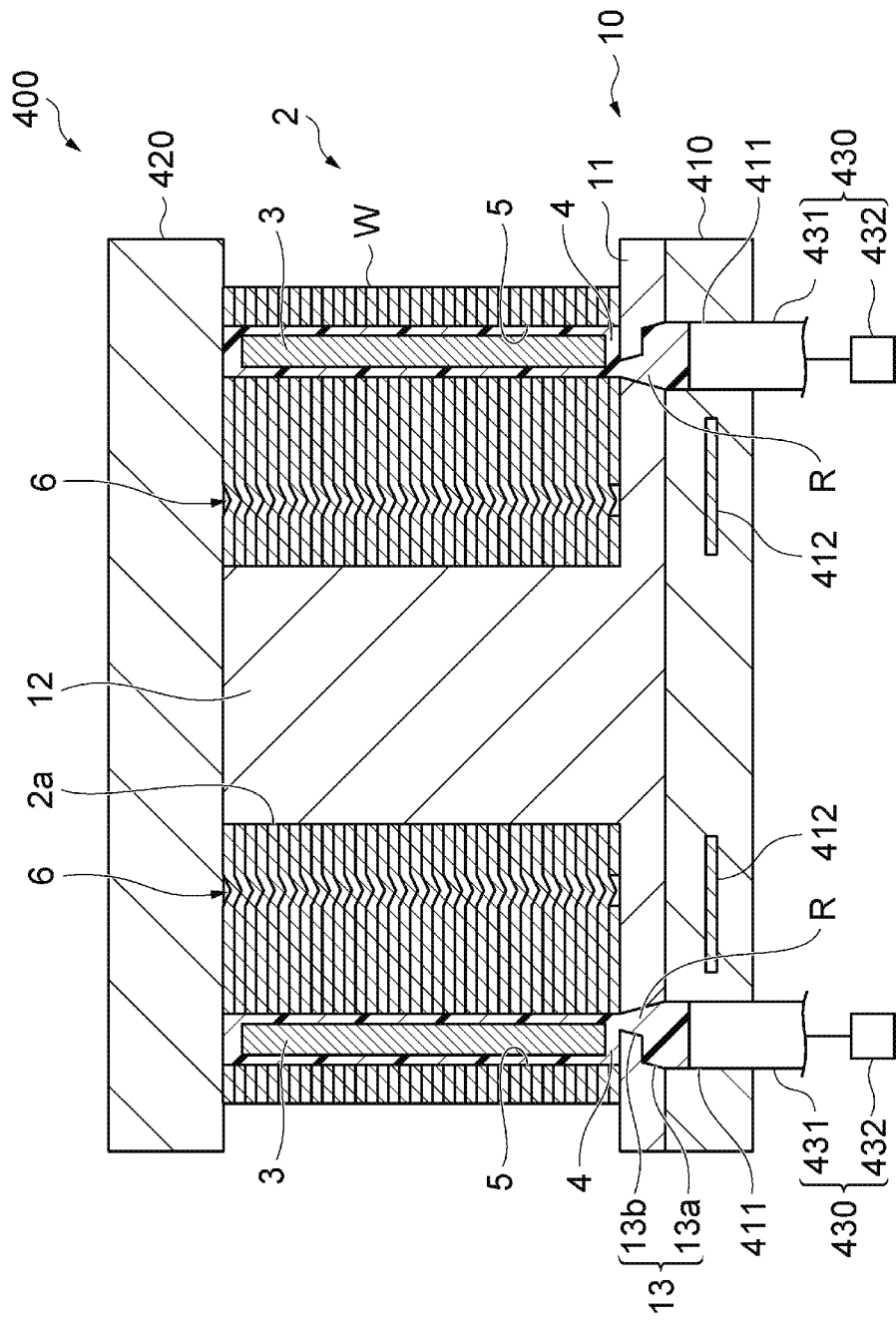
FIG. 3 is a sectional view schematically illustrating an example of a resin supply device.

As illustrated in FIG. 3, the conveying jig 10 includes a base member 11 and an insertion post 12. The base member 11 is configured to be capable of placing the laminated body 2. The base member 11 may have a plate shape. The base member 11 may include a plurality of resin flow paths 13. The resin flow path 13 may include, for example, a recess portion 13a and a through hole 13b.

The recess portion 13a is open toward the lower surface of the base member 11. The recess portion 13a may be a recessed groove (so-called runner groove) provided to extend along the lower surface of the base member 11, or may configure an accommodation space that can accommodate the tip end of a plunger 431 to be described later. The through hole 13b penetrates the base member 11 in the height direction (thickness direction) of the base member 11 to reach the upper surface of the base member 11 from the bottom surface of the recess portion 13a. Each exit (openings on the upper surface side of the base member 11) of the plurality of through holes 13b may be disposed to overlap each magnet insertion hole 5 of the laminated body 2 when viewed from above in a state where the laminated body 2 is placed on the conveying jig 10. As illustrated in FIG. 3, the recess portion 13a and/or the through hole 13b may have a tapered shape that expands as moving from the upper surface toward the lower surface of the base member 11.

The insertion post 12 is positioned approximately at the center portion of the base member 11, and protrudes upward from the upper surface of the base member 11. The insertion post 12 has a cylindrical shape, and has an outer shape corresponding to the shaft hole 2a of the laminated body 2. The laminated body 2 is in a state of being mounted on the conveying jig 10 when the insertion post 12 is inserted into the shaft hole 2a and the laminated body 2 is placed on the base member 11.

Returning to FIG. 2, the magnet attachment device 300 is configured to dispose one or more permanent magnets 3 in one magnet insertion hole 5. The magnet attachment device 300 may be, for example, a robot hand. After the permanent magnet 3 is disposed in the magnet insertion hole 5, the laminated body 2 is conveyed to the resin supply device 400 by the conveying unit Cv2, for example, together with the conveying jig 10 (refer to arrow Ar2 in FIG. 2).

The resin supply device 400 is configured to supply molten resin into the magnet insertion hole 5 where the permanent magnet 3 is disposed. The details of the resin supply device 400 will be described later. After the resin is supplied to the magnet insertion hole 5, the laminated body 2 is conveyed to the resin supply device 400 by the conveying unit Cv3, for example, together with the conveying jig 10 (refer to arrow Ar3 in FIG. 2).

The removing device 500 is configured to remove the laminated body 2 placed on the conveying jig 10 from the conveying jig 10, and accordingly, the rotor-laminated core 1 is formed. The rotor-laminated core 1 is conveyed to a subsequent device, for example, by the conveying unit Cv4 (refer to arrow Ar4 in FIG. 2). The removing device 500 is configured to remove a residual resin R (refer to FIG. 3) in the resin flow path 13 of the conveying jig 10 from the resin flow path 13. The conveying jig 10 after the residual resin R is removed, is conveyed to the press working device 200, for example, by the conveying unit Cv5 (refer to arrow Ar5 in FIG. 2).

The controller Ctr is configured, for example, to generate signals for operating each of the devices 200 to 500 and each of the conveying units Cv1 to Cv5 respectively, based on a program recorded in a recording medium (not illustrated) or an operation input from an operator. The controller Ctr is configured to send the generated signals to each of the devices 200 to 500 and each of the conveying units Cv1 to Cv5.

[Resin Supply Device]

Next, with reference to FIG. 3, the configuration of the resin supply device 400 will be described in more detail. The resin supply device 400 is configured to melt resin tablets (resin material) to make molten resin and supply the molten resin into the magnet insertion hole 5 where the permanent magnet 3 is disposed. The resin supply device 400 includes a lower mold 410, an upper mold 420, and a plurality of extrusion mechanisms 430.

The lower mold 410 is disposed below the conveying jig 10 and is configured to support the conveying jig 10 in a state where the laminated body 2 is mounted thereon. The lower mold 410 includes a plurality of through holes 411. The through hole 411 may extend so as to penetrate the lower mold 410 in the height direction of the lower mold 410. One resin tablet may be accommodated in one through hole 411, or the plurality of resin tablets may be accommodated in one through hole 411.

The upper mold 420 is disposed above the conveying jig 10, and is configured to be capable of sandwiching the laminated body 2 and the conveying jig 10 in the height direction together with the lower mold 410. When the upper mold 420 and the lower mold 410 sandwich the laminated body 2 and the conveying jig 10, the lower mold 410 and the upper mold 420 are configured to apply a predetermined magnitude of load in the height direction to the laminated body 2.

When the laminated body 2 and the conveying jig 10 are sandwiched by the lower mold 410 and the upper mold 420, each through hole 411 may be respectively positioned at locations corresponding to each of the resin flow paths 13 of the conveying jig 10. For example, each of the through holes 411 may be positioned to partially or entirely overlap each of the resin flow paths 13 when viewed from above.

The lower mold 410 may include a heating source 412. A heating source 222 may be configured to operate based on instructions from the controller Ctr, for example, may be a heater. The heating source 412 may be configured to heat the resin tablet accommodated in each of the through holes 411 by heating the lower mold 410. When the resin tablet is heated by the heating source 412, the resin tablet melts and turns into molten resin. The heating source 412 may be disposed inside the upper mold 420 or outside the lower mold 410 or the upper mold 420. The lower mold 410 or the upper mold 420 may include the heating source 412.

The extrusion mechanism 430 is configured to extrude the molten resin into the magnet insertion hole 5. Each of the extrusion mechanisms 430 includes the plunger 431 and a driving source 432. Each of the plungers 431 is configured to be insertable into the corresponding through hole 411 from below. Each of the driving sources 432 is configured to operate based on instructions from the controller Ctr. Each of the driving sources 432 is configured to move the corresponding plunger 431 up and down. Therefore, each of the plungers 431 may be inserted and removed independently of the corresponding through holes 421 by the corresponding driving sources 432.

The extrusion mechanism 430 may include one driving source 432 connected to the plurality of plungers 431. In this case, one driving source 432 may be configured to move the plurality of plungers 431 up and down substantially at the same time. The stop position of the tip end (upper end) of the plunger 431 when the molten resin is extruded into the magnet insertion hole 5 may be in the through hole 411 or in the recess portion 13a of the resin flow path 13.

[Removing Device]

Next, with reference to FIGS. 4 to 7, the configuration of the removing device 500 will be described in more detail. The removing device 500 includes a collection unit 510, a holding unit 520, a separation unit 530, an extrusion unit 540, and a disposal unit 550.

The collection unit 510 includes a collection box 511, a support member 512, a plurality of raising and lowering rollers 513, a first stopper 514 (stopper), a second stopper 515 (another stopper), a first pusher 516, and a second pusher 517.

Figure 4:
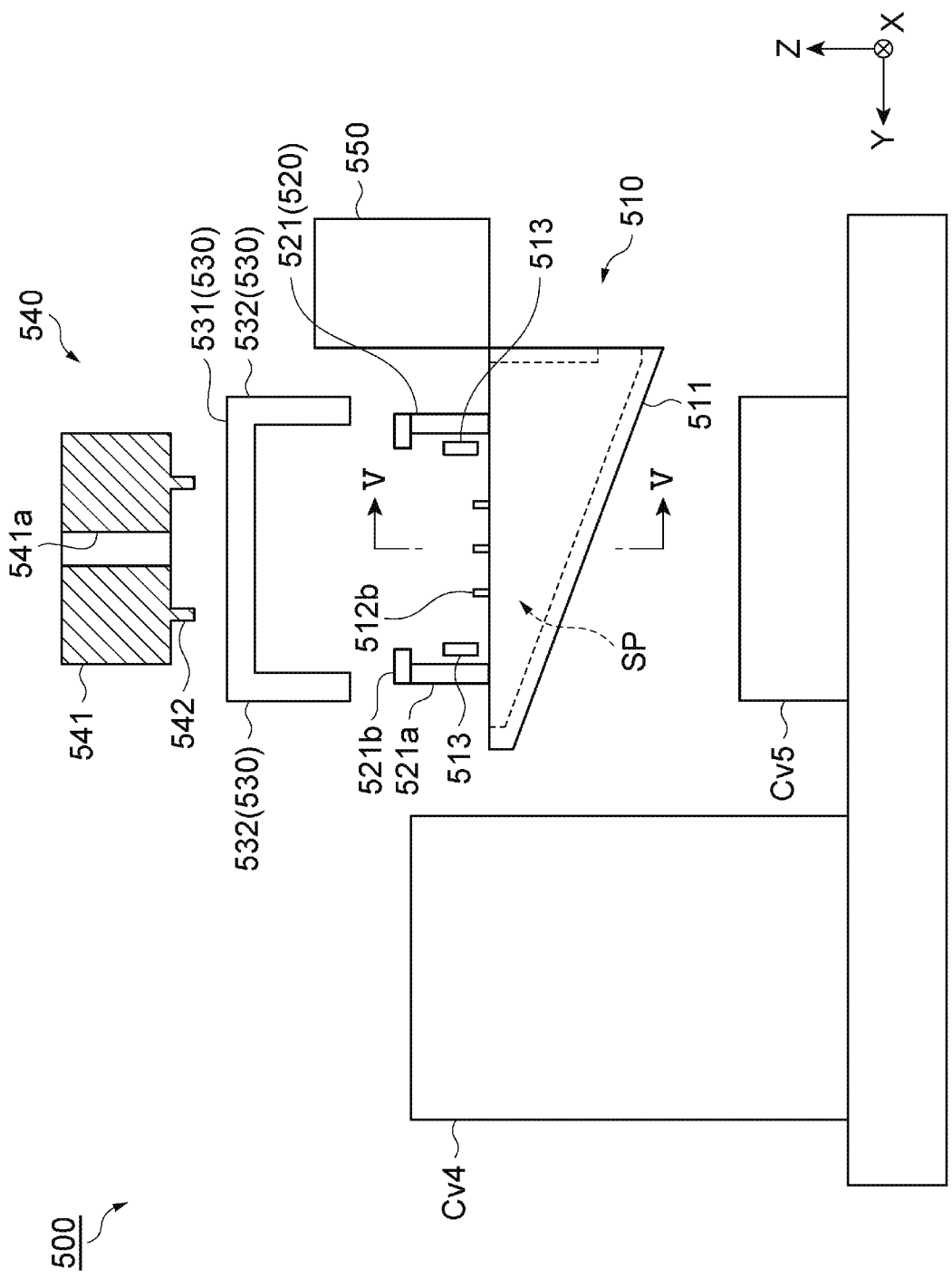
FIG. 4 is a side view schematically illustrating an example of a device for removing residual resin.
Figure 5:
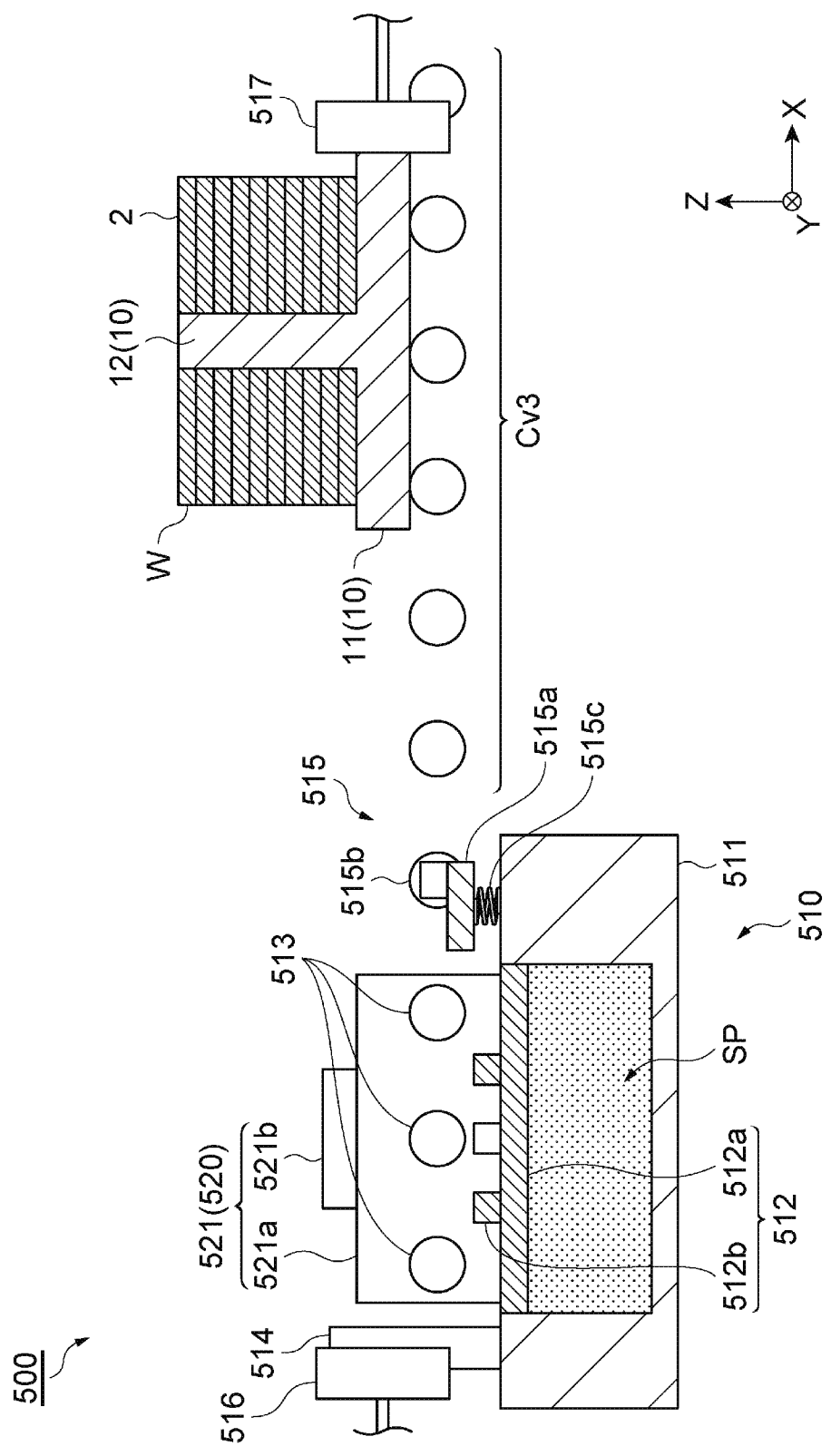
FIG. 5 is a sectional view cut along line V-V of FIG. 4.
Figure 6:
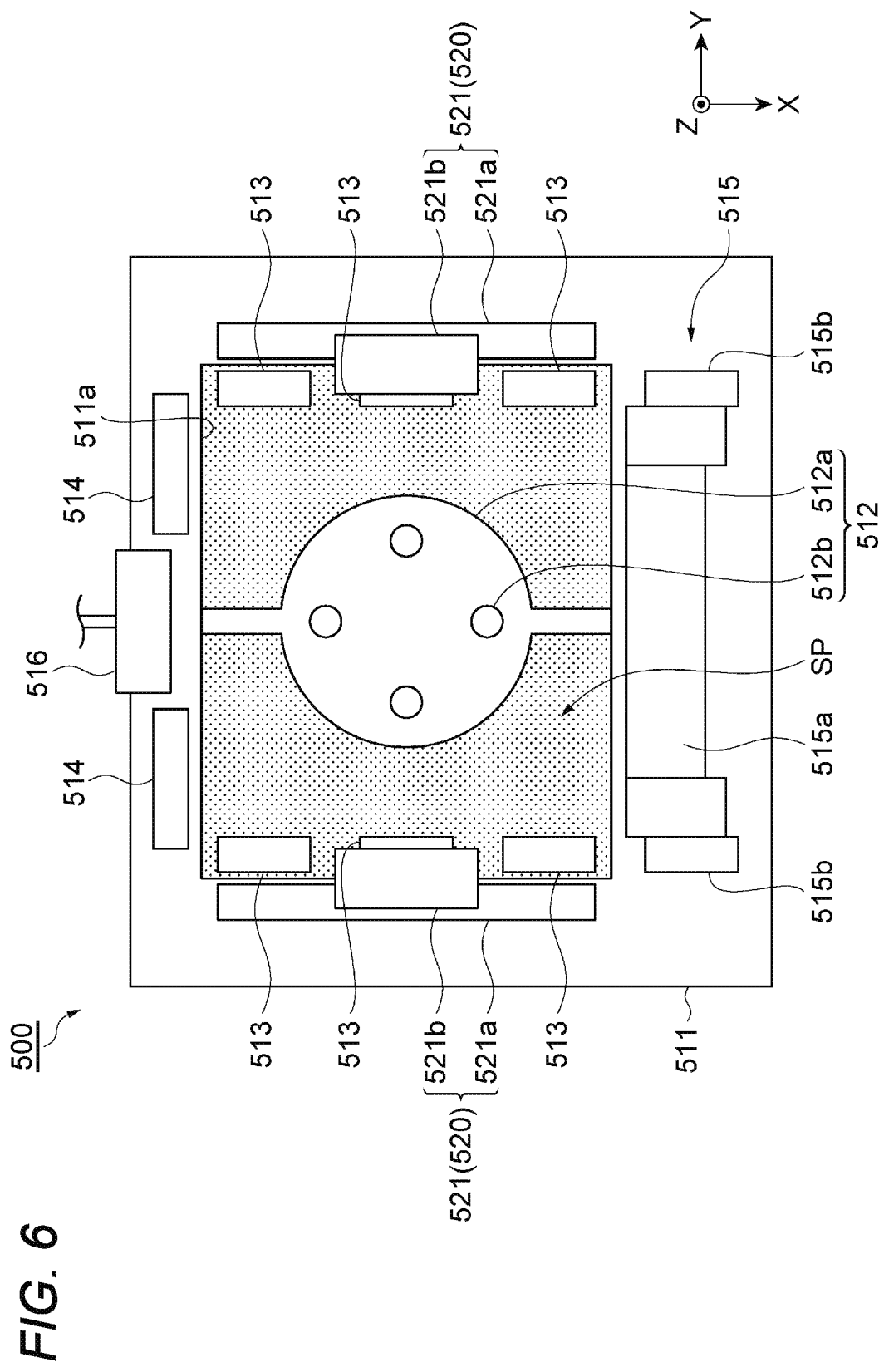
FIG. 6 is a top view schematically illustrating an example of a collection unit.

As illustrated in FIGS. 4 to 6, the collection box 511 is configured to support the raising and lowering roller 513, the first stopper 514, the second stopper 515, and the holding unit 520. On the upper surface of the collection box 511, an opening portion 511a that is open upward is formed. The size of the opening portion 511a may overlap most of the conveying jig 10 when viewed from above in a state where the conveying jig 10 is placed on the collection unit 510.

On the inside of the collection box 511, a recessed space SP that communicates with the opening portion 511a is formed. As illustrated in FIG. 4, the bottom wall surface of the collection box 511 is an inclined surface that drops as moving toward the disposal unit 550. Therefore, the residual resin R that drops toward the collection box 511 reaches the inside of the recessed space SP through the opening portion 511a, and slides down along the inclined surface in the recessed space SP.

Figure 16:
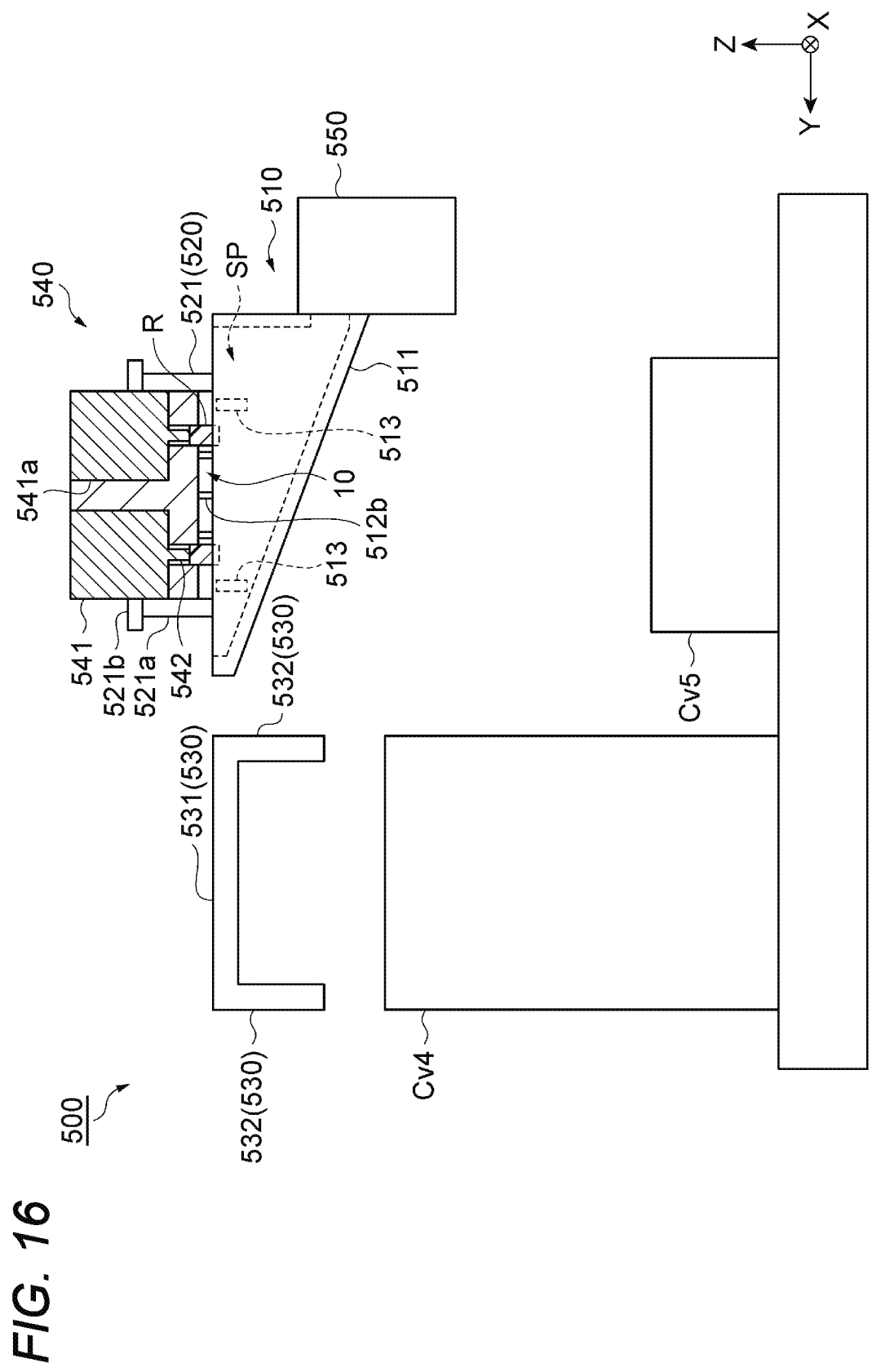
FIG. 16 is a view for describing an example of a process after FIG. 15.

The collection box 511 is connected to a driving source (not illustrated), and is configured to move up and down in the height direction (Z direction in FIG. 4 and the like) by the operation of the driving source based on instructions from the controller Ctr. The collection box 511 may, for example, be configured to be capable of stopping at each of the first to fourth height positions. As illustrated in FIGS. 4 and 5, the first height position may be the height corresponding to the conveying unit Cv3. The second height position may be lower than the first height position, or more specifically, may be lower than a height position obtained by subtracting the length of the insertion post 12 from the first height position. The third height position may be the height corresponding to the extrusion unit 540 (refer to FIG. 16). The fourth height position may be the height corresponding to the conveying unit Cv5 (refer to FIG. 18).

The support member 512 is configured to temporarily support the conveying jig 10. The support member 512 includes a base member 512a and a plurality of support projections 512b. As illustrated in FIGS. 5 and 6, the base member 512a is disposed in the vicinity of the opening portion 511a of the collection box 511. The base member 512a may partially close the opening portion 511a not to overlap the resin flow path 13 of the conveying jig 10 in a state of being supported by the support member 512 when viewed from above. In this case, the residual resin R can easily avoid the base member 512a and drop. The base member 512a may be inclined with respect to the horizontal surface. For example, the base member 512a may include a conical surface of which the height decreases as moving toward the outer circumferential edge. In these cases, even when the residual resin R rides on the base member 512a, the residual resin R can easily drop into the collection box 511 through the inclined surface.

The support projection 512b protrudes upward from the surface of the base member 512a. All tip ends of the plurality of support projections 512b may be positioned at the same height. In this case, since the plurality of support projections 512b support the conveying jig 10 on a virtual horizontal surface, the conveying jig 10 is stabilized on the support member 512. The support projection 512b may be disposed not to overlap the resin flow path 13 of the conveying jig 10 in a state of being supported by the support member 512 when viewed from above. In this case, the residual resin R can easily avoid the support member 512 and drop.

The raising and lowering roller 513 is configured with a pair of wheels facing each other in the horizontal direction (Y direction in FIG. 4 and the like) perpendicular to the Z direction. As illustrated in FIGS. 4 and 6, the pair of wheels is disposed such that the support member 512 is positioned therebetween. The interval between the pair of wheels is set so that the interval is narrower than the width of the conveying jig 10. The plurality of raising and lowering rollers 513 are arranged in a row along a direction (X direction in FIG. 4 and the like) orthogonal to both the Y direction and the Z direction. The X direction is also the moving direction of the conveying jig 10 in the collection unit 510.

The raising and lowering roller 513 is connected to a driving source (not illustrated), and is configured to move up and down in the Z direction by the operation of the driving source based on instructions from the controller Ctr. The raising and lowering roller 513 may be raised or lowered between the raised position (refer to FIG. 5 and the like) where the upper end is positioned above the upper end of the support projection 512b, and the lowered position (refer to FIG. 14 and the like) where the upper end is positioned below the upper end of the support projection 512b. When the raising and lowering roller 513 is at the lowered position, the raising and lowering roller 513 may be partially or entirely positioned in the recessed space SP.

As illustrated in FIGS. 5 and 6, the first stopper 514 and the second stopper 515 are disposed on the collection box 511 so that the opening portion 511a is positioned therebetween when viewed from above. In other words, the first stopper 514 and the second stopper 515 face each other in the X direction. In a state where the collection box 511 is in the first height position, as illustrated in FIG. 5, the second stopper 515 is positioned closer to the conveying unit Cv3 than the first stopper 514.

The first stopper 514 is configured to stop the conveying jig 10 conveyed into the collection unit 510 from the conveying unit Cv3 at the position of the first stopper 514. As illustrated in FIG. 6, the first stopper 514 may include a pair of plate-like members arranged along the Y direction. The separation distance between the pair of plate-like members may be set to be greater than the width of the first pusher 516 to make it possible for the first pusher 516 to pass therebetween.

Figure 7:
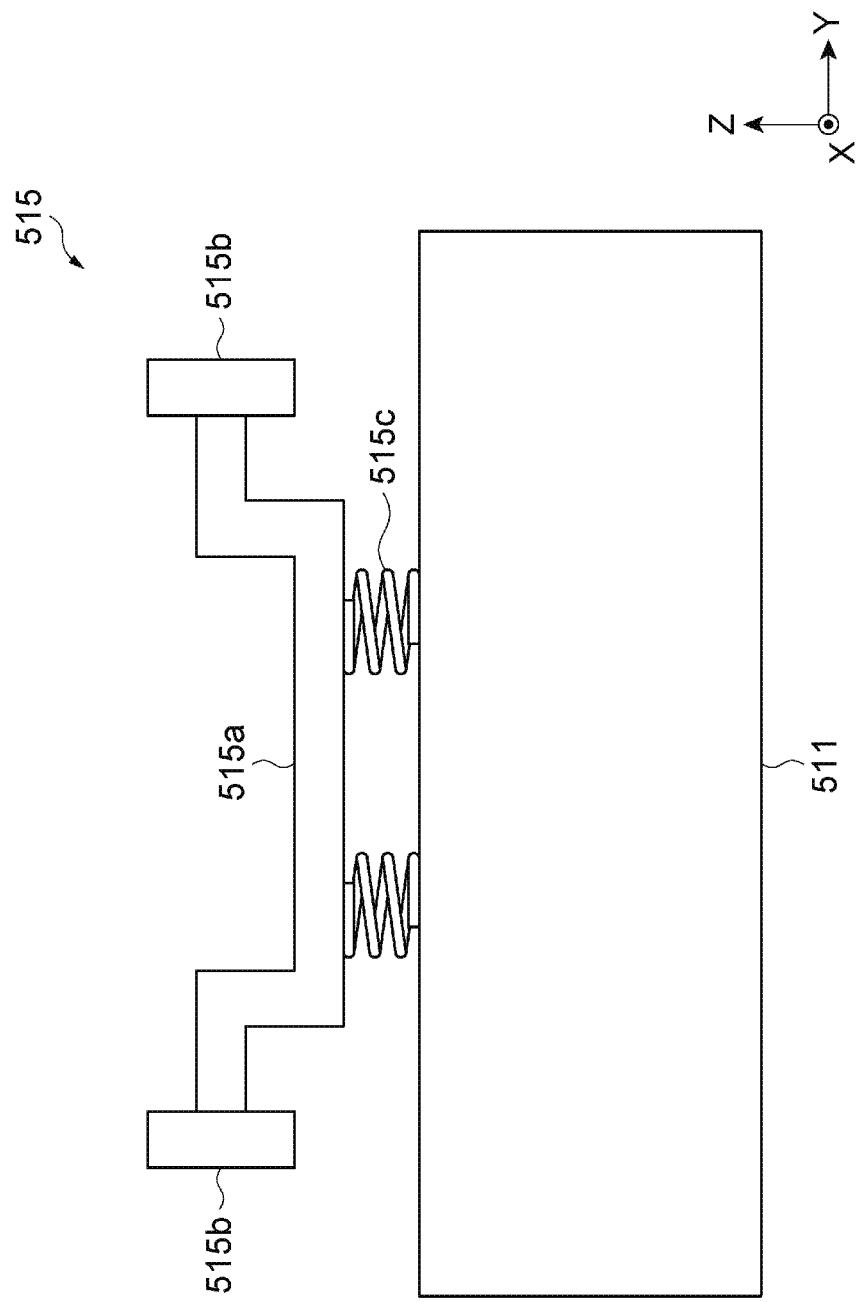
FIG. 7 is a front view illustrating an example of a second stopper.

The second stopper 515 is configured to prevent the conveying jig 10 conveyed into the collection unit 510 from the conveying unit Cv3 from returning to the conveying unit Cv3. As illustrated in FIGS. 5 to 7, the second stopper 515 includes a base member 515a, a roller 515b, and a biasing member 515c. The base member 515a extends in the Y direction and has a crank shape in which the center part extends lower than both end portions. Therefore, collision between the second pusher 517 and the center part of the base member 515a, which is caused when the second pusher 517 advances and retreats (to be described later), is prevented.

The roller 515b is configured with a pair of wheels rotatably attached on both end portions of the base member 515a. The interval between the pair of wheels that configures the roller 515b is set to be narrower than the width of the conveying jig 10, and may be the same as the interval between the pair of wheels that configure the raising and lowering roller 513. The biasing member 515c connects the center part of the base member 515a to the upper surface of the collection box 511. The biasing member 515c is configured to bias the base member 515a and the roller 515b upward. The biasing member 515c can be, for example, a compressed coil spring or rubber.

As illustrated in FIGS. 5 and 6, the first pusher 516 is disposed on the first stopper 514 side with respect to the collection box 511. The first pusher 516 is connected to a driving source (not illustrated), and is configured to be capable of advancing and retreating in the X direction by the operation of the driving source based on instructions from the controller Ctr. In a case where the conveying jig 10 is positioned in the collection unit 510, when the first pusher 516 extends to approach the second stopper 515 passing between the pair of plate-like members of the first stopper 514, the conveying jig 10 is extruded from the collection unit 510.

As illustrated in FIG. 5, the second pusher 517 is disposed on the second stopper 515 side (conveying unit Cv3 side) with respect to the collection box 511. The second pusher 517 is connected to a driving source (not illustrated), and is configured to be capable of advancing and retreating in the X direction by the operation of the driving source based on instructions from the controller Ctr. In a case where the conveying jig 10 is positioned in the conveying unit Cv3, when the second pusher 517 extends to approach the first stopper 514 without being in contact with the center part of the base member 515a of the second stopper 515, the conveying jig 10 is extruded from the conveying unit Cv3 to the collection unit 510.

As illustrated in FIGS. 4 to 6, the holding unit 520 is configured with a pair of holding members 521. The pair of holding members 521 is attached to the collection box 511 so that the opening portion 511a is positioned therebetween when viewed from above. The pair of holding members 521 faces each other in the Y direction.

The holding member 521 includes a base member 521a, which has a plate shape, and a movable member 521b. The base member 521a is positioned in the vicinity of the opening portion 511a and extends along the X direction. The interval between the pair of base members 512a is set to be the same as or slightly greater than the width of the conveying jig 10. Therefore, the pair of base members 512a functions as a guide member when the conveying jig 10 slides along the X direction on the raising and lowering roller 513.

Figure 15:
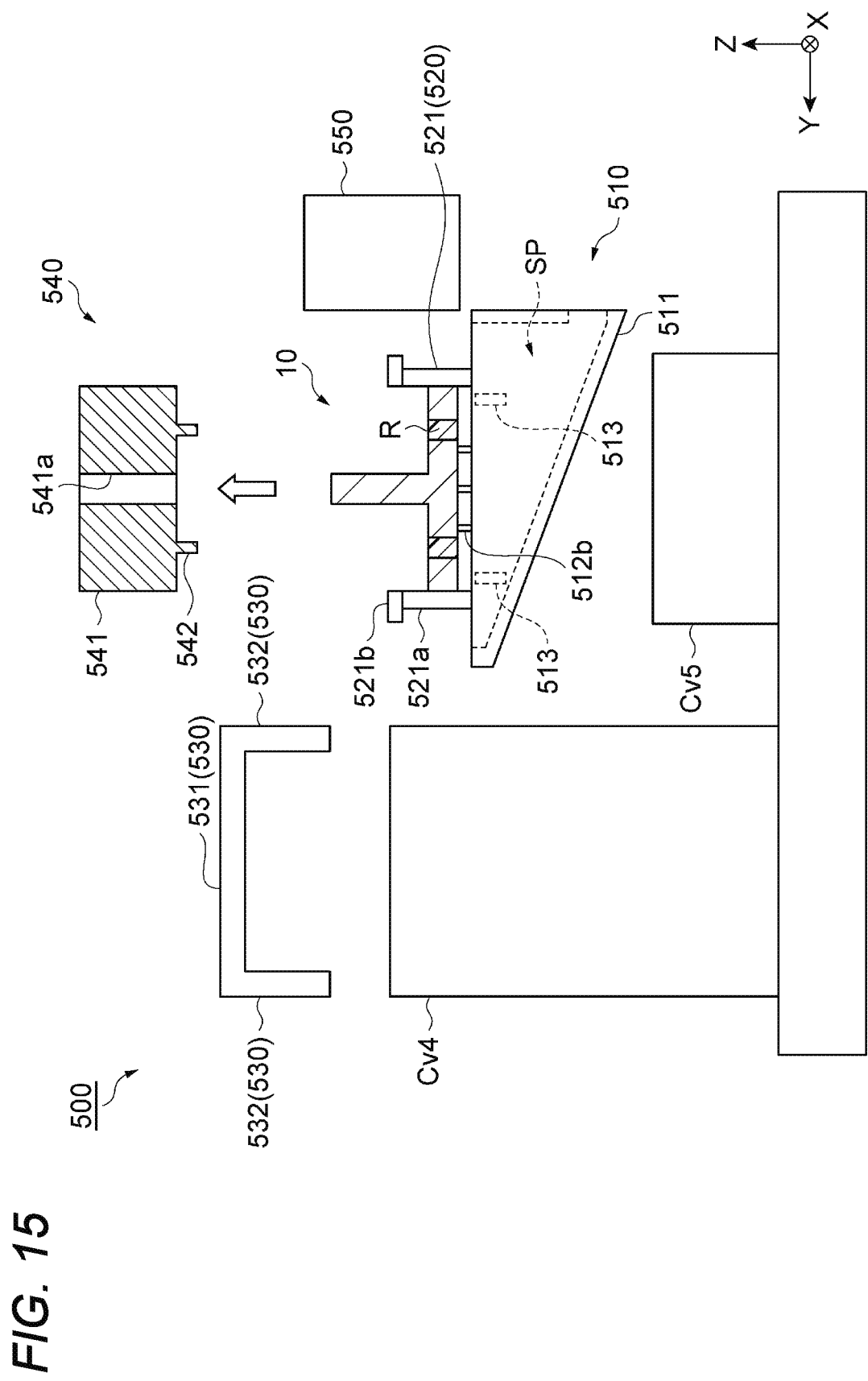
FIG. 15 is a view for describing an example of a process after FIGS. 13 and 14.

The movable member 521b is attached to the upper end portion of the holding member 521. The movable member 521b is connected to a driving source (not illustrated), and is configured to be capable of moving in the Y direction by the operation of the driving source based on instructions from the controller Ctr. The movable member 521b may move between an approaching position where the movable member 521b approaches the center side of the opening portion 511a in the Y direction (refer to FIGS. 4, 6, and the like) and a separated position where the movable member 521b moves away from the opening portion 511a in the Y direction (refer to FIG. 15 and the like).

When the movable member 521b is at a close position and the raising and lowering roller 513 is at the raised position, the separation distance between the movable member 521b and the raising and lowering roller 513 in the Z direction is set to be the same as or slightly greater than the thickness of the base member 11 of the conveying jig 10. In this case, when the conveying jig 10 is positioned on the raising and lowering roller 513, the base member 11 can hardly move between the raising and lowering roller 513 and the movable member 521b in the up-down direction. Therefore, the movement of the conveying jig 10 in the up-down direction is restricted.

The separation unit 530 is configured to separate and remove the laminated body 2 mounted on the conveying jig 10 from the conveying jig 10. As illustrated in FIG. 4, the separation unit 530 is positioned above the collection box 511 to overlap the opening portion 511a. The separation unit 530 may be positioned above the upper surface of the conveying unit Cv4.

The separation unit 530 includes a base member 531 and a pair of movable members 532. The base member 531 is connected to a driving source (not illustrated), and is configured to be capable of moving in the Y direction by the operation of the driving source based on instructions from the controller Ctr. The base member 531 may move between a first overlapping position where the base member 531 overlaps the opening portion 511a when viewed from above and a second overlapping position where the base member 531 overlaps the conveying unit Cv4 when viewed from above.

The pair of movable members 532 is attached to the base member 531 to protrude from the base member 531. The pair of movable members 532 may protrude downward from the base member 531 (refer to FIG. 4 and the like) or may protrude in the same direction along the horizontal direction from the base member 531. The pair of movable members 532 has a plate shape and faces each other in the Y direction. At least one of the pair of movable members 532 is connected to a driving source (not illustrated), and is configured to be capable of moving in the Y direction by the operation of the driving source based on instructions from the controller Ctr. For example, at least one of the pair of movable members 532 may move in the Y direction so that an approaching state where the pair of movable members 532 approaches each other and a separated state where the pair of movable members 532 move away from each other occur.

In the separated state, the laminated body 2 mounted on the conveying jig 10 is disposed between the pair of movable members 532, and then, the approaching state of the pair of movable members 532 is achieved, and accordingly, the laminated body 2 is sandwiched by the pair of movable members 532. For the purpose of more reliably sandwiching the laminated body 2 by the pair of movable members 532, the respective facing surfaces of the pair of movable members 532 may be curved surfaces corresponding to the circumferential surfaces of the laminated body 2.

The extrusion unit 540 is configured to extrude the residual resin R, which is the solidified resin remaining in the resin flow path 13 of the conveying jig 10, downward from the resin flow path 13. As illustrated in FIG. 4, the extrusion unit 540 includes a base member 541 and a plurality of extrusion projections 542.

The base member 541 is positioned above the collection unit 510 and the separation unit 530 when the base member 531 is at the first overlapping position. In other words, when the base member 531 is at the first overlapping position, the collection unit 510, the separation unit 530, and the extrusion unit 540 are arranged in a row along the Z direction (vertical direction). The base member 541 is removably attached to a non-movable object such as a wall surface (not illustrated). Therefore, the base member 541 does not have to move in any of the X direction, the Y direction, and the Z direction in a state of being attached to the non-movable object.

An accommodation hole 541a extending along the Z direction is formed at the center portion of the base member 541. The accommodation hole 541a may be open to the lower surface of the base member 541. In other words, the accommodation hole 541a may be a through hole that penetrates the base member 541, or may be a non-through hole that does not penetrate the base member 541. The opening area and the height of the accommodation hole 541a are set to be greater than the diameter and the height of the insertion post 12 of the conveying jig 10, respectively.

The plurality of extrusion projections 542 protrude downward from the lower surface of the base member 541. Each of the extrusion projections 542 may be respectively disposed to overlap each of the resin flow paths 13 of the base member 11 when viewed from above. The size of the extrusion projection 542 when viewed from above is set to be less than that of the through hole 13b. The height of the extrusion projection 542 is not limited as long as the residual resin R can be extruded from the resin flow path 13 by the extrusion projection 542.

The disposal unit 550 is configured as an accumulation container for disposing of the residual resin R collected in the collection box 511. The disposal unit 550 is disposed to adjacent to the collection box 511 when the collection box 511 is at the third height position. When a predetermined amount of residual resin R has accumulated in the disposal unit 550, the disposal unit 550 may be automatically or manually replaced with another empty disposal unit 550. Otherwise, the residual resin R that has reached the inside of the disposal unit 550 may be disposed of each time.

[Method for Manufacturing Rotor-Laminated Core]

Subsequently, with reference to FIGS. 2 to 19, the method for manufacturing the rotor-laminated core 1 will be described. First, as illustrated in FIG. 2, based on the instructions of the controller Ctr, the press working device 200 laminates the plurality of punching members W while sequentially punching metal plates to form the laminated body 2 (refer to step S1 in FIG. 19). The laminated body 2 discharged from the press working device 200 is mounted on the conveying jig 10 such that each of the magnet insertion holes 5 and each of the resin flow paths 13 (through hole 13b) at least partially overlap each other. After this, the laminated body 2 is conveyed to the magnet attachment device 300 by the conveying unit Cv1 together with the conveying jig 10 (refer to arrow Ar1 in FIG. 2).

Figure 19:
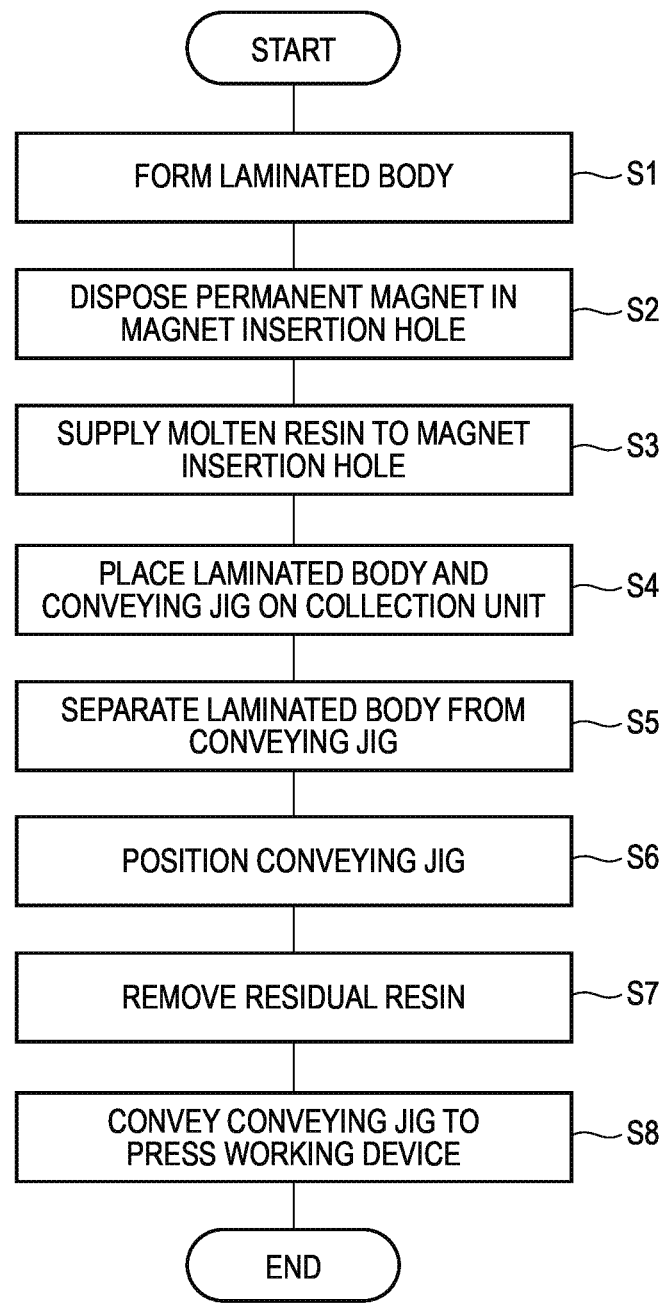
FIG. 19 is a flowchart for describing an example of a method for removing the residual resin.

Next, based on the instructions of the controller Ctr, the magnet attachment device 300 disposes the permanent magnet 3 in each of the magnet insertion holes 5, respectively (refer to step S2 in FIG. 19). After this, the laminated body 2 is conveyed to the magnet attachment device 300 by the conveying unit Cv1 together with the conveying jig 10 (refer to arrow Ar2 in FIG. 2).

Next, the resin supply device 400 operates based on the instructions of the controller Ctr. When the laminated body 2 and the conveying jig 10 are conveyed in, the resin supply device 400 sandwiches the laminated body 2 and the conveying jig 10 between the lower mold 410 and the upper mold 420. Accordingly, the laminated body 2 is pressurized in the height direction. In this state, the resin tablet is fed into each of the through holes 411, and the resin tablet is heated by the heating source 412. The heating source 412 may be operated before the resin tablet is fed into the through hole 411, and the lower mold 410 may be heated to a predetermined temperature in advance.

When the resin tablet is in a molten state, the driving source 432 drives the plunger 431 based on the instructions of the controller Ctr. Accordingly, as illustrated in FIG. 3, the molten resin in each of the through holes 411 is supplied into each of the magnet insertion holes 5 by the plunger 431 (refer to step S3 in FIG. 19). As a result, the magnet insertion hole 5 is filled with molten resin, and a part of the molten resin remains in the resin flow path 13. The molten resin in the magnet insertion hole 5 and in the resin flow path 13 solidifies inside thereof.

Figure 2:
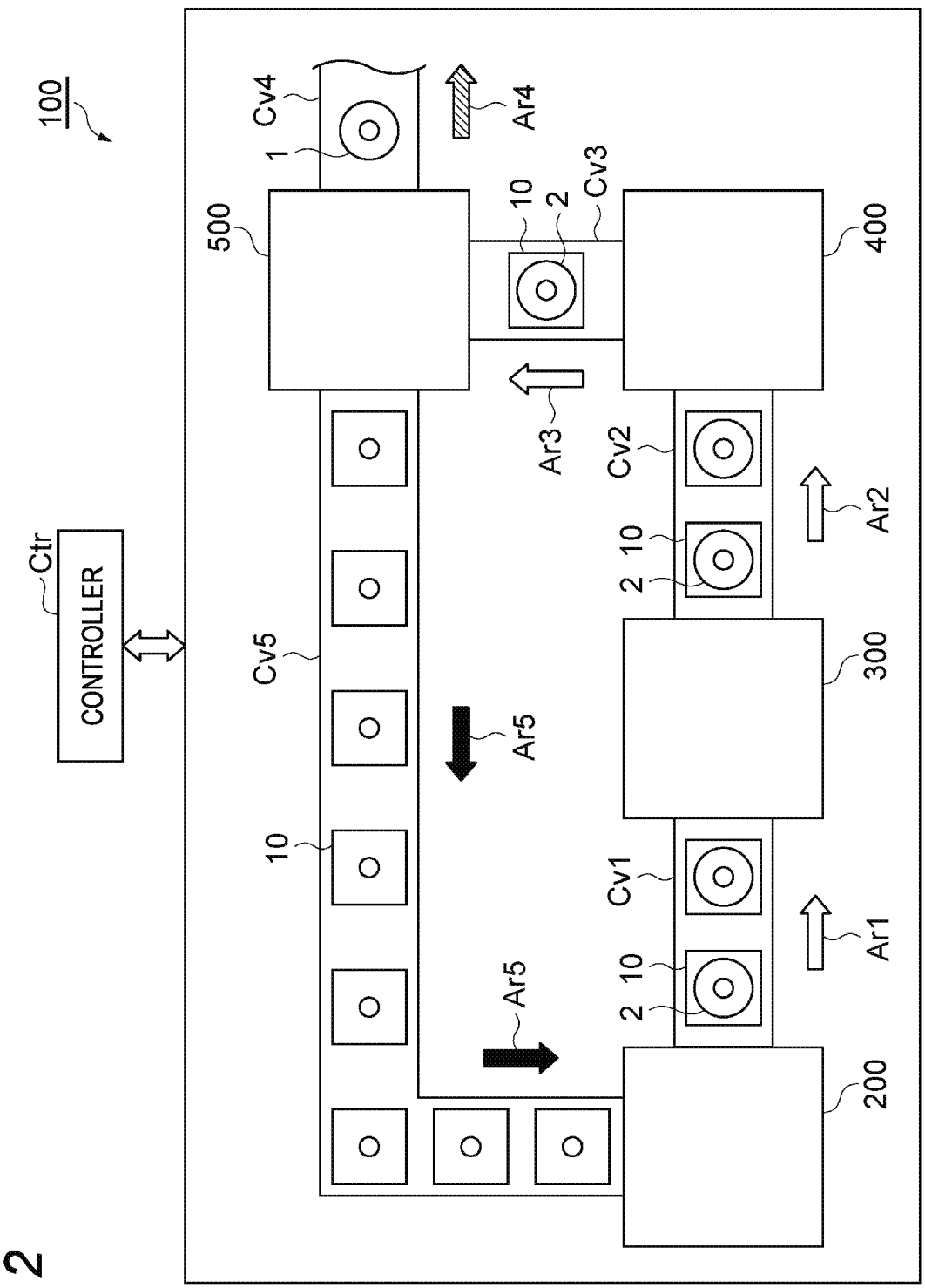
FIG. 2 is a schematic view illustrating an example of a manufacturing apparatus of the rotor-laminated core.

After this, the laminated body 2 is conveyed to the removing device 500 by the conveying unit Cv3 together with the conveying jig 10 (refer to arrow Ar3 in FIG. 2). At this time, in the removing device 500, as illustrated in FIG. 5, the collection box 511 is positioned at the first height position, the raising and lowering roller 513 is positioned at the raised position, and the movable member 521b is positioned at the close position.

Figure 8:
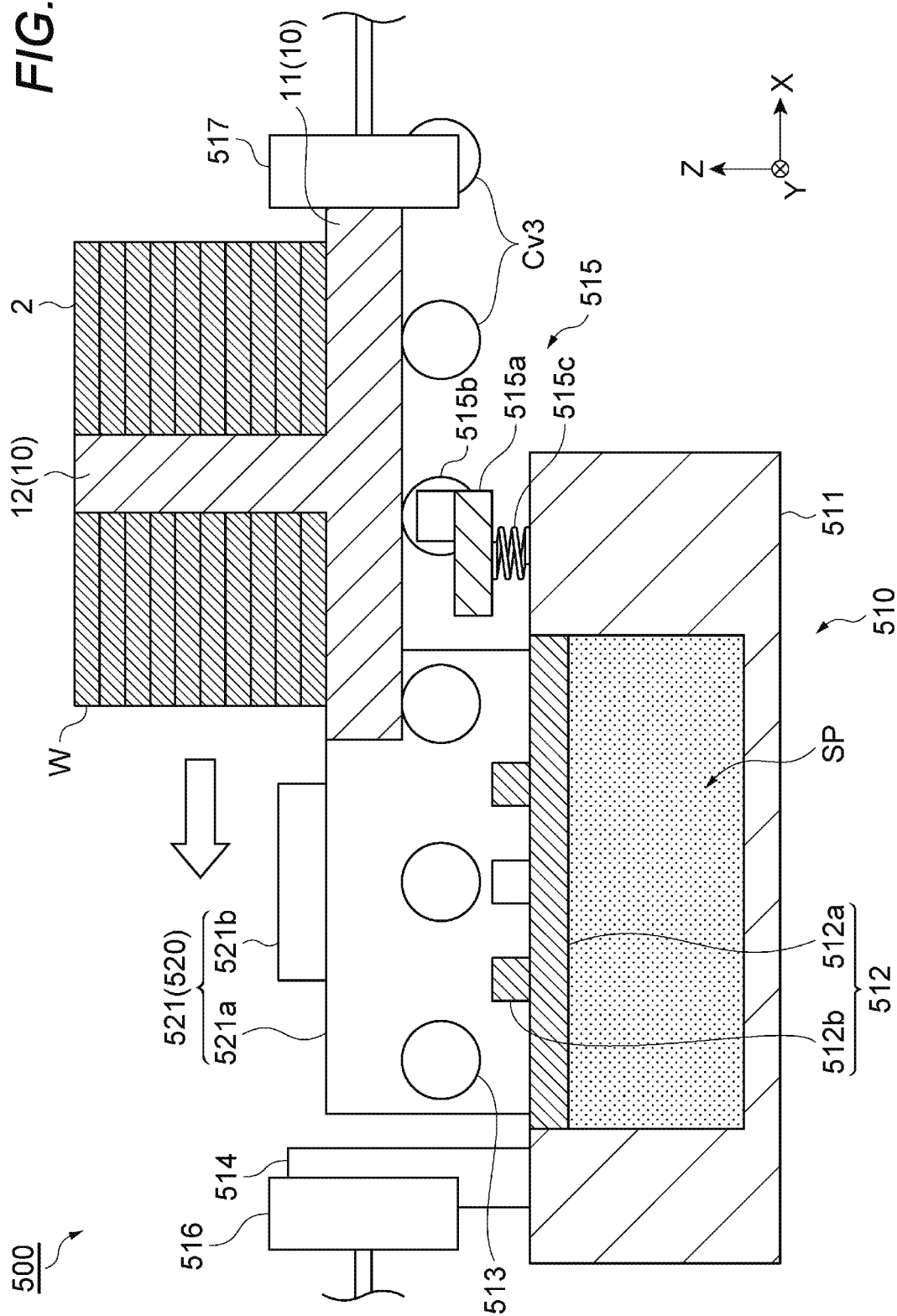
FIG. 8 is a view for describing an example of a process of removing the residual resin.
Figure 9:
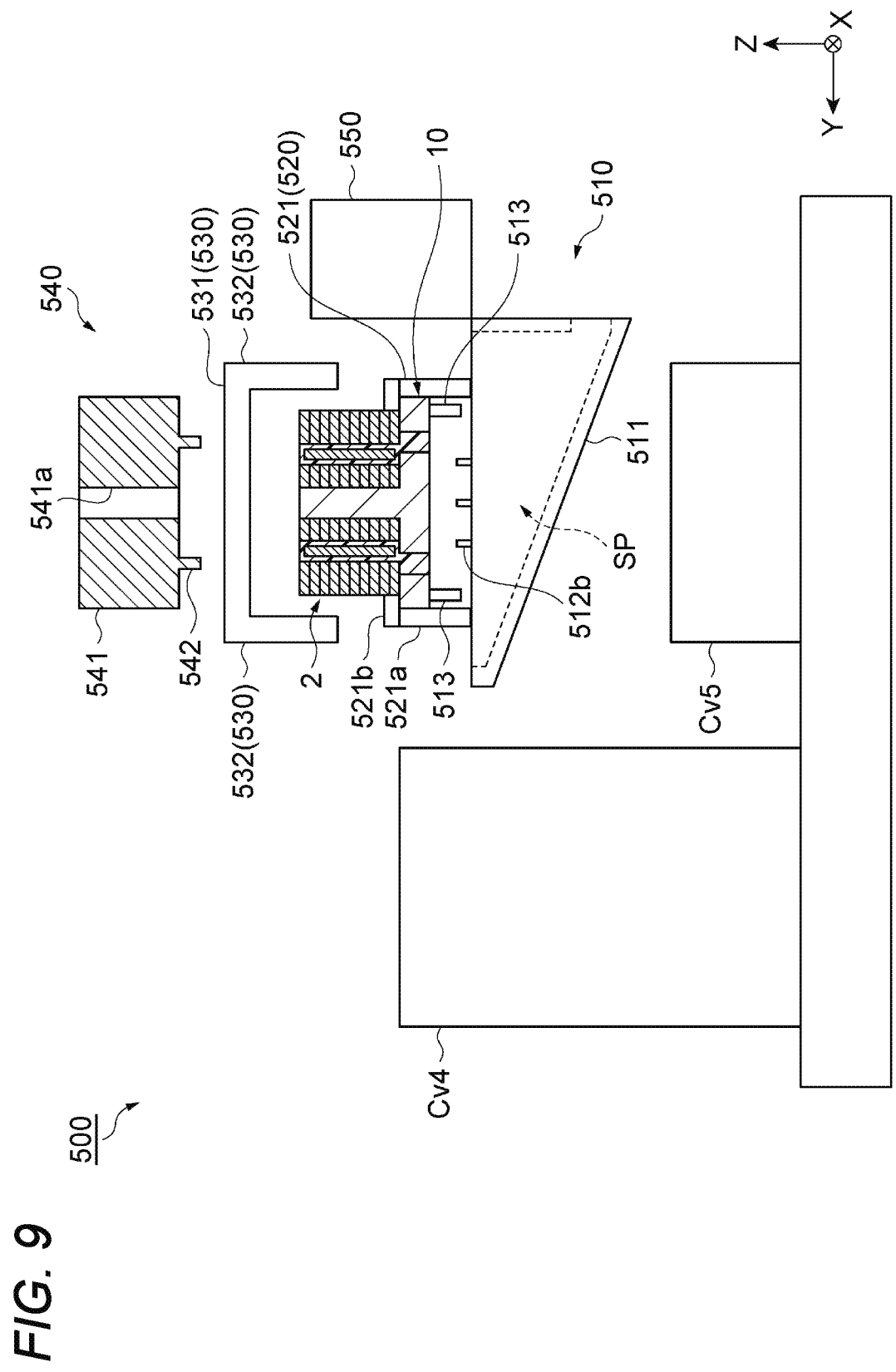
FIG. 9 is a view for describing an example of a process after FIG. 8.
Figure 10:
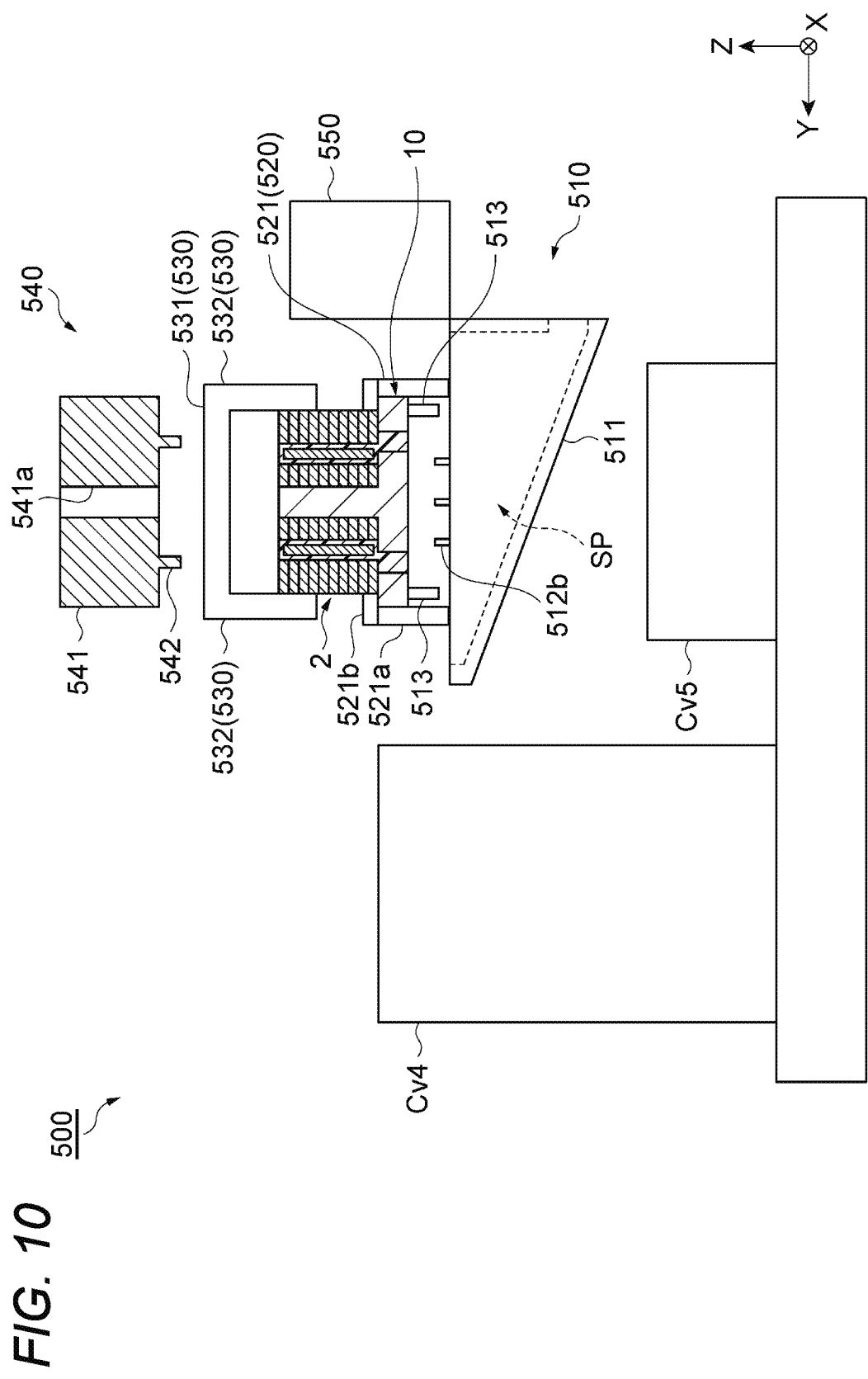
FIG. 10 is a view for describing an example of a process after FIG. 9.
Figure 11:
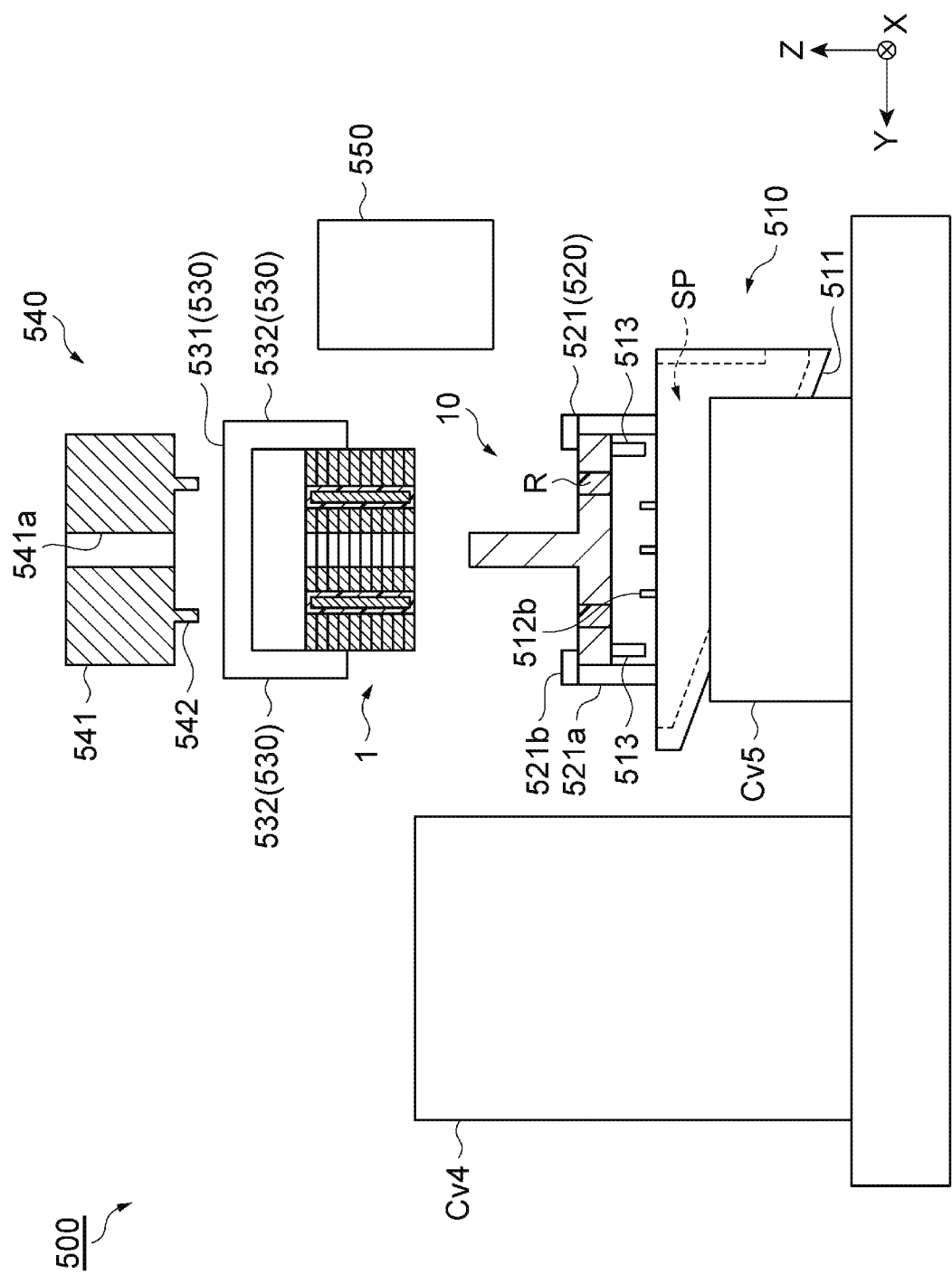
FIG. 11 is a view for describing an example of a process after FIG. 10.
Figure 12:
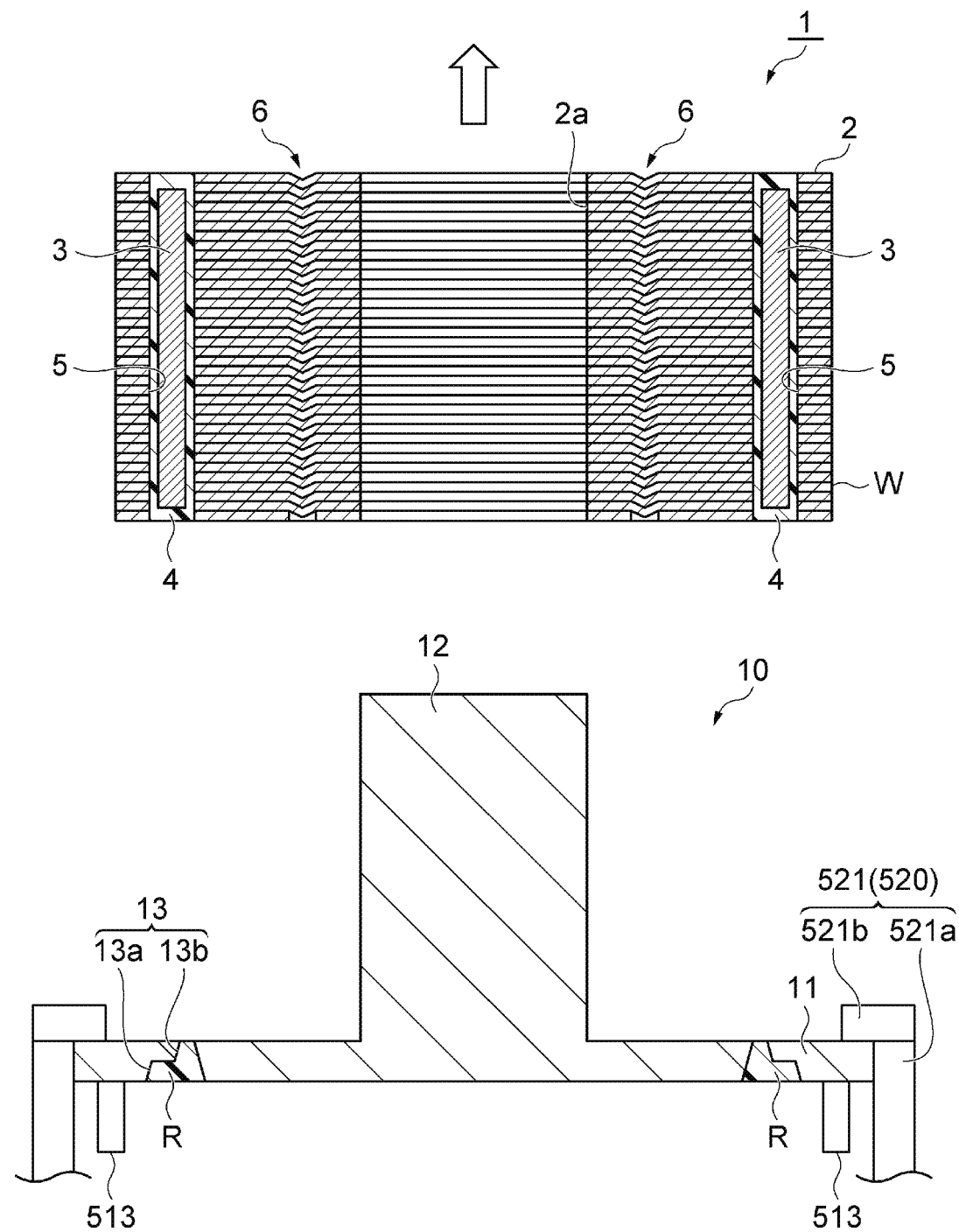
FIG. 12 is an enlarged view illustrating the rotor-laminated core and a conveying jig in FIG. 11.

When the laminated body 2 and the conveying jig 10 reach the downstream end of the conveying unit Cv3, as illustrated in FIG. 8, the second pusher 517 operates to approach the collection unit 510 based on the instructions of the controller Ctr. Accordingly, the base member 11 pushed by the second pusher 517 slides on the conveying unit Cv3, the roller 515b, and the raising and lowering roller 513 until reaching the first stopper 514 while being guided by the pair of base members 521a in the Y direction and being guided by the raising and lowering roller 513 and the movable member 521b in the Z direction. As a result, as illustrated in FIG. 9, the laminated body 2 and the conveying jig 10 are placed on the collection unit 510 (refer to step S4 in FIG. 19). At this time, the outer circumferential surface of the laminated body 2 partially overlaps the pair of movable members 532 of the separation unit 530 in the Y direction.

Since the roller 515b is biased upward by the biasing member 515c, once the base member 11 passes through the roller 515b, the roller 515b moves upward. Therefore, the base member 11 is less likely to return to the conveying unit Cv3 side by the roller 515b.

Next, based on the instructions of the controller Ctr, at least one of the pair of movable members 532 operates so that the approaching state where the pair of movable members 532 approaches each other is achieved. Accordingly, the outer circumferential surface of the laminated body 2 is sandwiched by the pair of movable members 532 (refer to FIG. 10). While maintaining this sandwiched state, the collection box 511 is lowered to be at the second height position based on the instructions of the controller Ctr (refer to FIG. 11).

At this time, the base member 11 is positioned between the raising and lowering roller 513 and the movable member 521b in the Z direction, is held by the raising and lowering roller 513 and the movable member 521b, and thus, the movement toward the laminated body 2 is restricted. Accordingly, as illustrated in detail in FIG. 12, the laminated body 2 is separated from the conveying jig 10, and the resin solidified in the magnet insertion hole 5 and the resin solidified in the resin flow path 13 are separated from each other between the lower end surface of the laminated body 2 and the upper surface of the base member 11 (refer to step S5 in FIG. 19). Accordingly, the solidified resin 4 is formed in the magnet insertion hole 5, and the rotor-laminated core 1 is completed. Furthermore, the residual resin R is formed when the solidified resin remains in the resin flow path 13.

Figure 13:
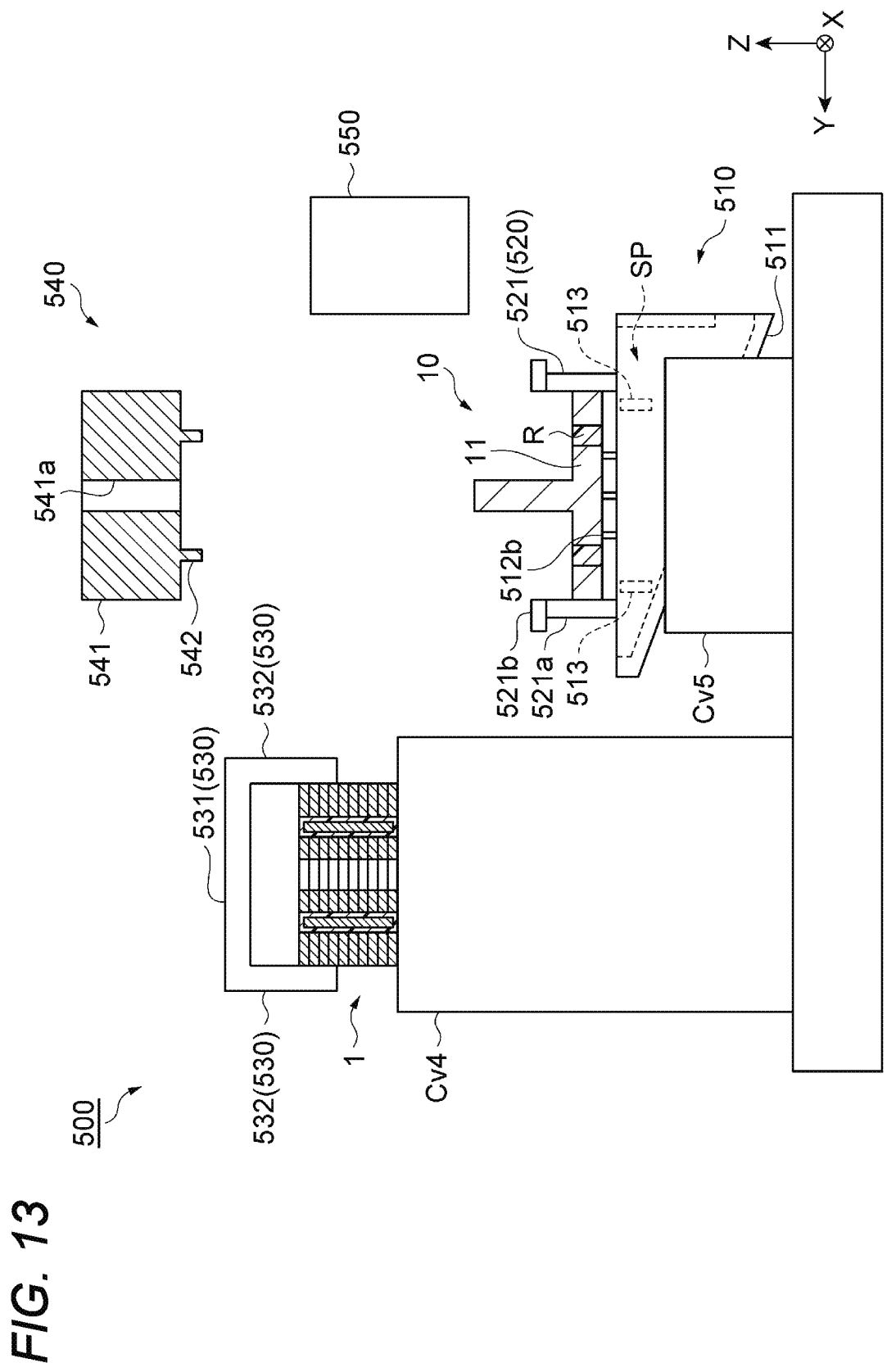
FIG. 13 is a view for describing an example of a process after FIG. 11.

Next, based on the instructions of the controller Ctr, the base member 531 is moved in the Y direction to be positioned at the second overlapping position (refer to FIG. 13). Accordingly, the rotor-laminated core 1 is placed on the conveying unit Cv4. Next, based on the instructions of the controller Ctr, at least one of the pair of movable members 532 operates so that the separated state where the pair of movable members 532 move away from each other is achieved. Accordingly, the sandwiching of the outer circumferential surface of the laminated body 2 by the pair of movable members 532 is released, and the rotor-laminated core 1 is conveyed to the subsequent process by the conveying unit Cv4.

Figure 14:
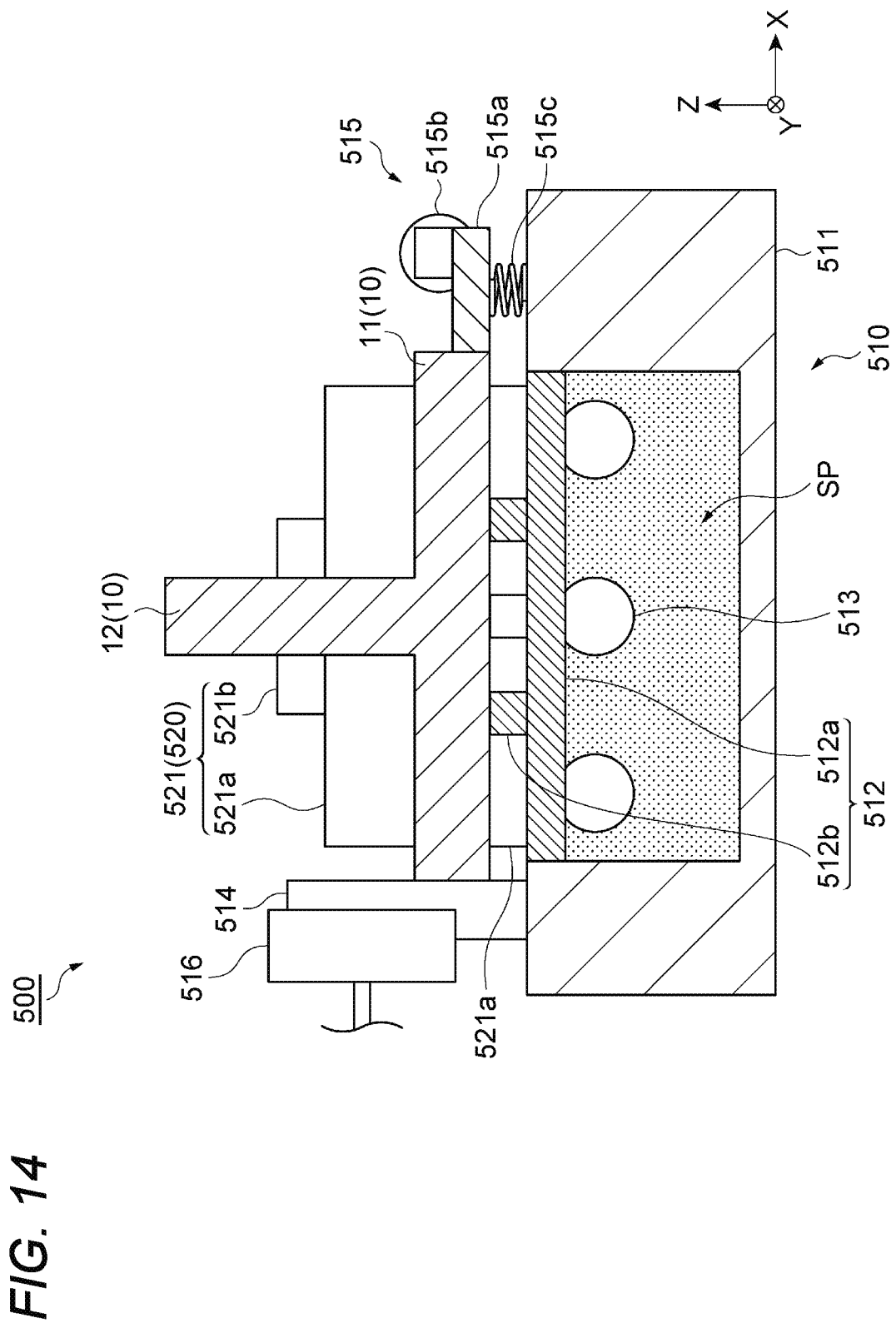
FIG. 14 is a view for describing an example of a process after FIG. 11.

Meanwhile, in the collection box 511 at the second height position, the raising and lowering roller 513 is lowered to be at the lowered position based on the instructions of the controller Ctr (refer to FIGS. 13 and 14). Accordingly, the conveying jig 10 is supported on the support projection 512b. At this time, as illustrated in FIGS. 13 and 14, the base member 11 is positioned by the first stopper 514 and the base member 515a in the X direction and by the pair of base members 521a in the Y direction (refer to step S6 in FIG. 19).

Next, the pair of movable members 521b moves to be at the separated position based on the instructions of the controller Ctr (refer to FIG. 13). In this state, the collection box 511 is raised to be at the third height position based on the instructions of the controller Ctr (refer to FIG. 15). When the collection box 511 is raised until the insertion post 12 is accommodated in the accommodation hole 541a and the upper surface of the base member 11 abuts against or is close to the lower surface of the base member 541, each of the extrusion projections 542 extrudes the residual resin R in the corresponding resin flow path 13 downward (refer to FIG. 15). Accordingly, the residual resin R drops from the resin flow path 13 into the collection box 511. As a result, the residual resin R is removed from the resin flow path 13 (refer to step S7 in FIG. 19). The residual resin R collected in the collection box 511 slides down along the bottom wall surface (inclined surface) of the collection box 511 and accumulates in the disposal unit 550 (refer to FIG. 17).

Figure 17:
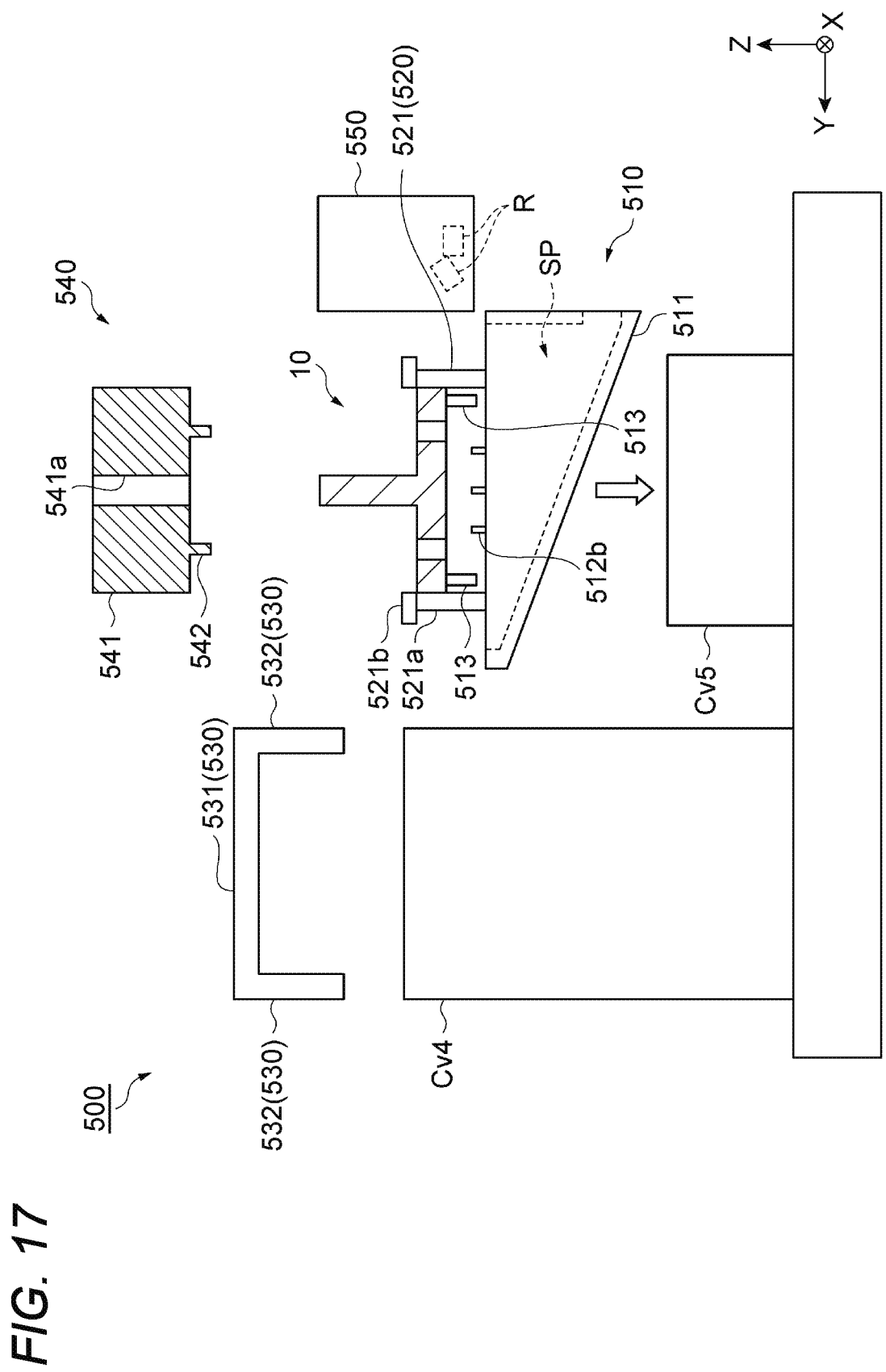
FIG. 17 is a view for describing an example of a process after FIG. 16.

Next, based on the instructions of the controller Ctr, the raising and lowering roller 513 is raised to be at the raised position (refer to FIG. 17). Accordingly, the conveying jig 10 is supported by the raising and lowering roller 513. Next, the collection box 511 is lowered to be at the fourth height position based on the instructions of the controller Ctr (refer to FIG. 17). Accordingly, the height of the raising and lowering roller 513 and the height of the conveying unit Cv5 are substantially equal to each other (refer to FIG. 18).

Figure 18:
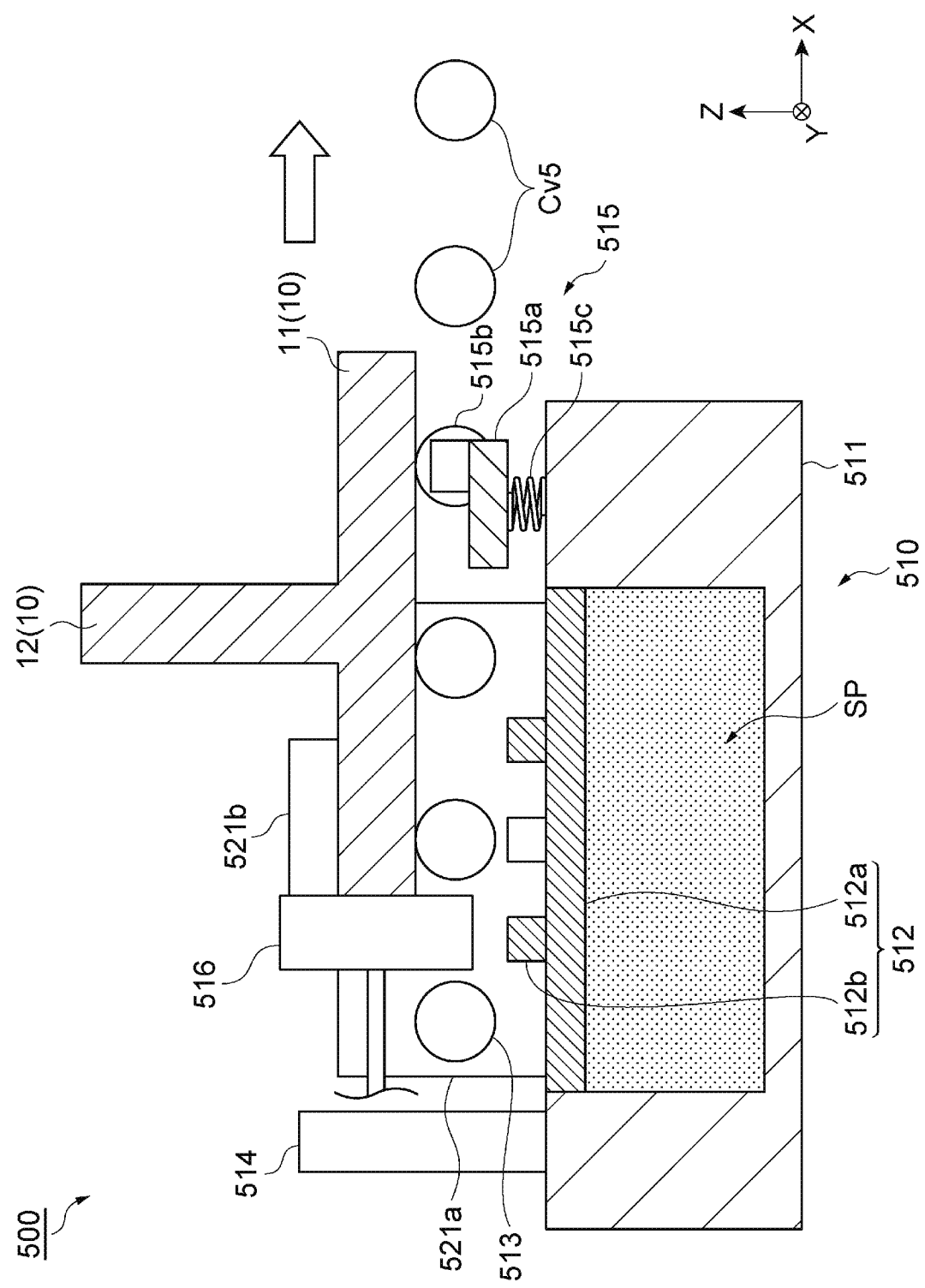
FIG. 18 is a view for describing an example of a process after FIG. 17.

Next, based on the instructions of the controller Ctr, the first pusher 516 operates to extend to the second stopper 515 passing between the pair of plate-like members of the first stopper 514 (refer to FIG. 18). Accordingly, the base member 11 pushed by the first pusher 516 slides on the raising and lowering roller 513, the roller 515b, and the conveying unit Cv5 while being guided by the pair of base members 521a in the Y direction. As a result, the conveying jig 10 is extruded to the conveying unit Cv5 and conveyed (returned) to the press working device 200 by the conveying unit Cv5 (refer to step S8 in FIG. 19).

Next, the pair of movable members 521b moves to be at the approaching position based on the instructions of the controller Ctr. The collection box 511 is raised to be at the first height position based on the instructions of the controller Ctr. Accordingly, the removing device 500 returns to the initial state illustrated in FIG. 4. After this, reception of the subsequent laminated body 2 and the conveying jig 10, separation of the laminated body 2 and the conveying jig 10 from each other, removal of the residual resin R from the resin flow path 13, conveyance of the rotor-laminated core 1 to the subsequent process, and conveyance of the conveying jig 10 to the press working device, are repeatedly executed.

[Action]

According to the above-described example, after the molten resin is supplied to the magnet insertion hole 5, the solidified resin in the resin flow path 13 is integrally connected to the solidified resin in the magnet insertion hole 5 while the laminated body 2 and the conveying jig 10 are conveyed to the collection unit 510. Therefore, the residual resin R does not fall off from the resin flow path 13 when the conveying jig 10 moves. Both the separation of the laminated body 2 from the conveying jig 10 and the extrusion of the residual resin R from the resin flow path 13 by the extrusion unit 540 are performed in a state where the conveying jig 10 is placed on the collection unit 510.

Therefore, the residual resin R in the resin flow path 13 is extruded by the extrusion unit 540 and collected in the collection unit 510. Otherwise, even when the residual resin R unexpectedly drops from the resin flow path 13 before extrusion by the extrusion unit 540 due to, for example, vibration during removal of the laminated body 2 from the conveying jig 10 or vibration generated in the conveying jig 10 until the residual resin R is extruded by the extrusion unit 540, the dropped residual resin R is collected in the collection unit 510. Therefore, in a state where the residual resin R is removed from the resin flow path 13, the conveying jig 10 moves to the next process. According to the above, it is possible to prevent the residual resin R that has fallen off from the conveying jig 10 from being scattered around.

According to the above-described example, the recess portion 13a and/or the through hole 13b that configure the resin flow path 13 may have a tapered shape that expands as moving from the upper surface toward the lower surface of the base member 11. In this case, when the residual resin R in the resin flow path 13 is pressed from above by the extrusion unit 540, the residual resin R easily drops downward. Therefore, it is possible to efficiently remove the residual resin R from the resin flow path 13.

According to the above-described example, the collection unit 510 and the extrusion unit 540 overlap each other in the Z direction (vertical direction), and by raising the collection box 511 so that the collection box 511 approaches the extrusion unit 540, the residual resin R is extruded from the resin flow path 13 by the extrusion projection 542. Therefore, since the moving distance of the collection box 511 becomes shorter, it is possible to compact the removing device 500 for removing the residual resin R. In this case, since the driving source for moving the extrusion unit 540 is not required, the removing device 500 for removing the residual resin R can be configured at a low cost.

According to the above-described example, the residual resin R dropped into the collection box 511 and collected is discharged into the disposal unit 550 disposed to be adjacent to the collection box 511 at the third height position. Therefore, since the disposal unit 550 does not move, it is possible to compact the removing device 500 for removing the residual resin R. Since the residual resin R collected in the collection box 511 is discharged to the disposal unit as appropriate, there is no need to stop the collection unit 510 to dispose of the residual resin R. Therefore, it is possible to increase the manufacturing efficiency of the rotor-laminated core 1.

According to the above-described example, on the upper surface of the collection box 511, the opening portion 511a that is open upward is formed. The size of the opening portion 511a may overlap most of the conveying jig 10 when viewed from above in a state where the conveying jig 10 is placed on the collection unit 510. In this case, even when the position of the resin flow path 13 varies, the resin flow path 13 is likely to overlap the opening portion 511a when the conveying jig 10 is placed on the collection unit 510. Therefore, the residual resin R extruded from the resin flow path 13 by the extrusion unit 540 easily drops into the collection box 511 through the opening portion 511a. Therefore, it is no longer necessary to prepare different types of collection boxes 511 separately according to different types of laminated bodies 2. As a result, it is possible to configure the removing device 500 for removing the residual resin R at a low cost while corresponding to different types of laminated bodies 2. On the upper surface of the collection box 511, a plurality of opening portions corresponding to two or more resin flow paths 13 may be formed, or a plurality of opening portions corresponding one-to-one to the plurality of resin flow paths 13 may be formed.

According to the above-described example, the base member 541 is removably attached to a non-movable object such as a wall surface (not illustrated). Therefore, the base member 541 may be replaced with another base member 541 having a different arrangement of the extrusion projections 542. In this case, the extrusion unit 540 can be replaced relatively easily and inexpensively. Therefore, it is possible to configure the removing device 500 for removing the residual resin R at a low cost while corresponding to different types of laminated bodies 2.

According to the above-described example, when separating the laminated body 2 and the conveying jig 10 from each other, the base member 11 is positioned between the raising and lowering roller 513 and the movable member 521*b* in the Z direction, and is held by the raising and lowering roller 513 and the movable member 521*b*. Therefore, the movement of the conveying jig 10 toward the laminated body 2 is restricted. Therefore, it is possible to remove the laminated body 2 from the conveying jig 10 more smoothly.

According to the above-described example, after the separation of the laminated body 2 from the conveying jig 10, the pair of movable members 521*b* moves to be at the separated position. Accordingly, the holding of the conveying jig 10 by the raising and lowering roller 513 and the movable member 521*b* is released. Therefore, the proximity of the extrusion unit 540 to the conveying jig 10 is less likely to be obstructed by the movable member 521*b*. Therefore, the extrusion of the residual resin R by the extrusion unit 540 can be performed more accurately.

According to the above-described example, the stop position of the conveying jig 10 conveyed into the collection unit 510 from the conveying unit Cv3 is defined by the first stopper 514. Therefore, it is possible to prevent the positional deviation in the X direction of the conveying jig 10 with respect to the collection box 511.

According to the above-described example, when the conveying jig 10 is supported on the support projection 512*b*, the conveying jig 10 is positioned by the first stopper 514 and the base member 515*a* in the X direction. Therefore, it is possible to more reliably prevent the positional deviation in the X direction of the conveying jig 10 with respect to the collection box 511.

[Modification Example]

The disclosure in the present specification should be considered exemplary in all respects and not restrictive. Various omissions, substitutions, changes, and the like may be made with respect to the above-described examples without departing from the scope of claims and the gist thereof.

(1) When the plurality of resin tablets are accommodated in one through hole 411, the size and/or material of these resin tablets may be the same or different.

(2) In the above-described example, a resin tablet T, that is, a solid resin material, is contained in the through hole 411, but a liquid or powdered resin material may be contained in the through hole 411.

(3) In the above-described example, the collection box 511 moves up and down so that the collection box 511 is close to or separated from the fixed base member 541, but the base member 541 may also be configured to move up and down. Otherwise, the collection box 511 and the base member 541 may be configured to be close to or separated from each other without being along the Z direction.

(4) In the above-described example, the extrusion projection 542 is fixed to the base member 541, but the extrusion unit 540 may include an extrusion pin that can move up and down with respect to the base member 541 instead of the extrusion projection 542. In this case, even when the base member 541 is not close to the base member 11 of the conveying jig 10, the extrusion pin advances downward to the base member 541, and accordingly, it is possible to extrude the residual resin R from the resin flow path 13. Therefore, the movable member 521*b* of the holding unit 520 may not move while being at the approaching position, or may be fixed to the base member 521*a*.

(5) The technology may be applied to core products other than the rotor-laminated core 1. Other core products may be, for example, stator-laminated cores, non-laminated type stator cores, and non-laminated type rotor cores. The stator core may be a split type stator core formed by combining a plurality of core pieces, or may be a non-split type stator core. A non-split type stator-laminated core may be formed of a plurality of laminated punching members W having a circular shape. Otherwise, in a non-split type stator-laminated core, a plurality of teeth may be provided on a single yoke, or a plurality of folded type punching members having an annular shape by being folded between the teeth may be laminated. In the non-laminated type rotor core or stator core, a strong magnetic body powder may be formed by compression molding, or a resin material containing a strong magnetic body powder may be formed by injection molding.

(6) The technology may be applied to the method for manufacturing the core products, including the process of filling a resin injection unit (for example, through hole, groove, and the like) that extends in the height direction with molten resin. For example, the technology may be applied when providing a resin film for insulating between the stator core and the winding on the inner circumferential surface of a slot of the stator core. Otherwise, the technology may be applied when filling the through hole provided in the laminated body 2 with molten resin for the purpose of joining the plurality of punching members W.

(7) In the above-described example, the laminated body 2 discharged from the press working device 200 is mounted on the conveying jig 10 which is conveyed from the removing device 500 to the press working device 200. However, the process of mounting the laminated body 2 onto the conveying jig 10 may be executed in a mounting device different from the press working device 200. In this case, the laminated body 2 discharged from the press working device 200 and the conveying jig 10 discharged from the removing device 500 are conveyed to the mounting device by each of different conveying units. When the laminated body 2 is mounted onto the conveying jig 10 in the mounting device, the laminated body 2 is conveyed to the magnet attachment device 300 by the conveying unit that extends between the mounting device and the magnet attachment device together with the conveying jig 10.

OTHER EXAMPLES

Example 1

An example of the method for manufacturing the core product (1) may include: supplying molten resin to the resin forming region (5) through the resin flow path (13) by the resin supply device (400) in a state where the core body (2) is placed on the conveying jig (10) so that the resin forming region (5) provided in the core body (2) communicates with the resin flow path (13) of the conveying jig (10); placing the conveying jig (10) on the collection unit (510) by conveying the conveying jig (10) from the resin supply device (400) to the collection unit (510) together with the core body (2), after supplying the molten resin; acquiring the core product (1) including the core body (2) and the solidified resin (4) formed in the resin forming region (5) and forming the residual resin (R) which is a residue of the solidified resin in the resin flow path (13), by removing the core body (2) from the conveying jig (10) and by separating the resin solidified in the resin forming region (5) from the resin solidified in the resin flow path (13), after placing the conveying jig (10) in the collection unit (510); and making the extrusion unit (540) abut against the residual resin (R) from above and dropping the residual resin (R) from the resin flow path (13) into the collection unit (510), after forming the residual resin (R). In this case, after the molten resin is supplied, the solidified resin in the resin flow path is integrally connected to the solidified resin in the resin forming region while the core body and the conveying jig are conveyed to the collection unit. Therefore, the residual resin does not fall off from the resin flow path when the conveying jig moves between the devices. Both the separation of the core body from the conveying jig and the extrusion of the residual resin from the resin flow path by the extrusion unit are performed in a state where the conveying jig is placed on the collection unit. Therefore, the residual resin in the resin flow path is extruded by the extrusion unit and collected in the collection unit. Otherwise, even when the residual resin unexpectedly drops from the resin flow path before extrusion by the extrusion unit due to, for example, vibration during removal of the core body from the conveying jig or vibration generated in the conveying jig until the residual resin is extruded by the extrusion unit, the dropped residual resin is collected in the collection unit. Therefore, in a state where the residual resin is removed from the resin flow path, the conveying jig moves to the next process. According to the above, it is possible to prevent the residual resin that has fallen off from the conveying jig from being scattered around.

Example 2

In the method according to Example 1, the resin flow path (13) may be a through hole that penetrates the conveying jig (10) in the up-down direction, and the through hole may have a tapered shape in which the area expands as moving downward. In this case, when the residual resin in the resin flow path is pressed from above by the extrusion unit, the residual resin easily drops downward. Therefore, it is possible to efficiently remove the residual resin from the resin flow path.

Example 3

In the method according to Example 1 or 2, dropping the residual resin (R) may include moving at least one of the collection unit (510) and the extrusion unit (540) along a vertical direction so that the collection unit (510) and the extrusion unit (540), which are disposed to overlap each other in the vertical direction, are close to each other. In this case, since the moving distance of the collection unit or the extrusion unit becomes shorter, it is possible to compact the removing device for removing the residual resin.

Example 4

In the method according to any of Examples 1 to 3, dropping the residual resin (R) may include raising the collection unit (510) toward the extrusion unit (540) to a raised position where the collection unit (510) abuts against the extrusion unit (540), and dropping the residual resin (R) from the resin flow path (13) into the collection unit (510). In this case, since the driving source for moving the extrusion unit is not required, the removing device for removing the residual resin can be configured at a low cost.

Example 5

In the method according to Example 4, dropping the residual resin (R) may include discharging the residual resin (R), which has dropped into the collection unit (510) from the resin flow path (13), to the disposal unit (550) positioned in the vicinity of the collection unit (510) which is at the raised position through the collection unit (510). In this case, since the disposal unit does not move, it is possible to compact the removing device for removing the residual resin. Since the residual resin collected in the collection unit is discharged to the disposal unit as appropriate, there is no need to stop the collection unit to dispose of the residual resin. Therefore, it is possible to increase the manufacturing efficiency of the core product.

Example 6

In the method according to any of Examples 1 to 5, the collection unit (510) may include the opening portion (511a) through which the residual resin (R) dropped from the resin flow path (13) can pass, and which is greater than the resin flow path (13) when viewed from the vertical direction. Depending on the type (for example, size) of the core product, the position of the resin forming region with respect to the core body may change, and accordingly, the position of the resin flow path of the conveying jig may also change. However, in a case of Example 6, since a relatively large opening portion is formed in the collection unit, the resin flow path is likely to overlap the opening portion when the conveying jig is placed on the collection unit, even when the position of the resin flow path varies. Therefore, the residual resin extruded from the resin flow path by the extrusion unit easily drops into the collection unit through the opening portion. Therefore, it is no longer necessary to prepare different types of collection units separately according to different types of core products. As a result, it is possible to configure the removing device for removing residual resin at a low cost while corresponding to different types of core products.

Example 7

In the method according to any of Examples 1 to 6, the extrusion unit (540) may be replaceable with another extrusion unit (540) depending on the type of core bodies (2). Incidentally, the extrusion unit can be replaced relatively easily and inexpensively. Therefore, in a case of Example 7, it is possible to configure the removing device for removing residual resin at a low cost while corresponding to different types of core products.

Example 8

In the method according to any of Examples 1 to 7, placing the conveying jig (10) on the collection unit (510) may include holding the conveying jig (10) placed on the collection unit (510) in the up-down direction between the collection unit (510) and the holding unit (520). In this case, the movement of the conveying jig in the up-down direction is limited by the fact that the conveying jig is held by the collection unit and the holding unit. Therefore, it is possible to remove the core body from the conveying jig more smoothly.

Example 9

In the method according to Example 8, dropping the residual resin (R) may include releasing the holding of the conveying jig (10) by the collection unit (510) and the holding unit (520). In this case, the proximity between the extrusion unit and the conveying jig is less likely to be obstructed by the holding unit. Therefore, the extrusion of the residual resin by the extrusion unit can be performed more accurately.

Example 10

In the method according to any of Examples 1 to 9, placing the conveying jig (10) on the collection unit (510) may include regulating movement of the conveying jig (10) by the stopper (514) that defines the stop position of the conveying jig (510) with respect to the collection unit (510). In this case, it is possible to prevent the positional deviation in the horizontal direction of the conveying jig with respect to the collection unit.

Example 11

In the method according to Example 10, placing the conveying jig (10) on the collection unit (510) may include regulating the movement of the conveying jig (10) in the direction in which the stopper (514) and another stopper (515) are arranged by disposing another stopper (515) on the opposite side of the stopper (514) with respect to the conveying jig (10) which is at the stop position. In this case, it is possible to more reliably prevent the positional deviation in the horizontal direction of the conveying jig with respect to the collection unit.

Example 12

An example of the method for removing the residual resin (R) may include: placing the conveying jig (10) on the collection unit (510) by conveying the conveying jig (10) to the collection unit (510) together with the core body (2) in a state where the core body (2) is placed on the conveying jig (10) and in a state where solidified resin is integrally formed inside the resin forming region (5) and the resin flow path (13) so that the resin forming region (5) provided in the core body (2) communicates with the resin flow path (13) of the conveying jig (10); forming the residual resin (R) which is a residue of the solidified resin in the resin flow path (13), by removing the core body (2) from the conveying jig (10) and by separating the resin solidified in the resin forming region (5) from the resin solidified in the resin flow path (13), after placing the conveying jig (10) in the collection unit (510); and making the extrusion unit (540) abut against the residual resin (R) from above and dropping the residual resin (R) from the resin flow path (13) to the collection unit (510), after forming the residual resin (R). In this case, the same effect as that of the method according to Example 1 is obtained.

Example 13

An example of the removing device (500) of the residual resin (R) may include: the conveying unit (Cv3) which is configured to convey the conveying jig (10) on which the core body (2) is placed, in which the resin forming region (5) is provided in the core body (2), and in which the resin flow path (13) that communicates with the resin forming region (5) is provided in a state where the core body (2) is placed on the conveying jig (10); the collection unit (510) configured to be capable of placing the conveying jig (10) thereon, which is conveyed by the conveying unit (Cv3); the separation unit (530) configured to remove the conveying jig (10) placed on the collection unit (510) and the core body (2) from each other; and the extrusion unit (540) configured to extrude the residual resin (R), which remains in the resin flow path (13) of the conveying jig (10) after the core body (2) is removed by the separation unit (530), downward toward the collection unit (510). In this case, the same effect as that of the method according to Example 1 is obtained.

What is claimed is:

1. A method for manufacturing a core product, the method comprising:
    supplying a molten resin to a resin forming region through a resin flow path by a resin supply device, in a state where a core body is placed on a conveying jig such that the resin forming region provided in the core body communicatably connects with the resin flow path of the conveying jig;
    placing the conveying jig on a collection unit by conveying the conveying jig from the resin supply device to the collection unit together with the core body, after the supplying of the molten resin;
    splitting the resin solidified in the resin forming region from the resin solidified inside the resin flow path by removing the core body from the conveying jig, after the placing of the conveying jig in the collection unit;
    forming a residual resin which is a residue of the solidified resin inside the resin flow path and acquiring the core product including the core body and solidified resin formed in the resin forming region, by the splitting; and
    dropping the residual resin from the resin flow path into the collection unit by causing an extrusion unit to abut against the residual resin from above, after the forming of the residual resin.

2. The method according to claim 1, wherein
    the dropping of the residual resin includes moving at least one of the collection unit and the extrusion unit along a vertical direction, such that the collection unit and the extrusion unit, which are disposed to overlap with each other in the vertical direction, get close to each other.

3. The method according to claim 1, wherein
    the dropping of the residual resin includes dropping the residual resin from the resin flow path into the collection unit, by raising the collection unit toward the extrusion unit to a raised position where the collection unit abuts against the extrusion unit.

* * * * *